United States Patent
Hanif et al.

(10) Patent No.: US 12,299,104 B1
(45) Date of Patent: May 13, 2025

(54) IDENTITY VERIFICATION WITH REUSABLE PROFILES

(71) Applicant: Shufti Pro Ltd., London (GB)

(72) Inventors: Muhammad Shahid Hanif, Lahore (PK); Raja Hassan Fayyaz, Lahore (PK); Frayyam Asif, Lahore (PK)

(73) Assignee: Shufti Pro Ltd, Lahore (PK)

( * ) Notice: Subject to any disclaimer, the term of this patent is extended or adjusted under 35 U.S.C. 154(b) by 0 days.

(21) Appl. No.: 18/639,708

(22) Filed: Apr. 18, 2024

(51) Int. Cl.
  *G06F 21/32* (2013.01)
  *G06V 30/19* (2022.01)
  *G06V 30/412* (2022.01)
  *G06V 40/16* (2022.01)
  *G06V 40/40* (2022.01)
  *G06V 40/70* (2022.01)

(52) U.S. Cl.
  CPC .............. *G06F 21/32* (2013.01); *G06V 30/19* (2022.01); *G06V 30/412* (2022.01); *G06V 40/168* (2022.01); *G06V 40/172* (2022.01); *G06V 40/45* (2022.01); *G06V 40/70* (2022.01)

(58) Field of Classification Search
  CPC ...... G06F 21/32; G06V 30/19; G06V 30/412; G06V 40/168; G06V 40/172; G06V 40/45; G06V 40/70
  See application file for complete search history.

(56) References Cited

U.S. PATENT DOCUMENTS

| | | | |
|---|---|---|---|
| 2017/0249452 A1* | 8/2017 | King | G07D 7/2016 |
| 2019/0050955 A1* | 2/2019 | Beaudet | G01G 19/44 |
| 2020/0320181 A1* | 10/2020 | Deutschmann | G06F 21/32 |
| 2021/0110015 A1* | 4/2021 | McCarty | G06F 21/32 |
| 2021/0266315 A1* | 8/2021 | Tav | G06F 3/013 |
| 2022/0067182 A1* | 3/2022 | Degioanni | G06F 21/6245 |
| 2023/0177508 A1* | 6/2023 | Ram | G06V 40/70 705/44 |

* cited by examiner

*Primary Examiner* — Wassim Mahrouka
(74) *Attorney, Agent, or Firm* — Sterne, Kessler, Goldstein & Fox P.L.L.C.

(57) ABSTRACT

Disclosed herein are system, method, and device embodiments for employing reusable profiles in an identity verification platform to verify a user's identity without re-capturing an ID or other document. When a user previously verified their identity with the platform, the platform may subsequently verify the user's identity using only a new self-image. By comparing the new self-image to all previously captured images in the repository of previously verified profiles, the platform may select a matching profile that is associated with a previously validated document. The platform may use the previously validated document to verify the user's identity. To enhance security and accuracy, the platform may enforce an additional knowledge-based authentication check and compare the new self-image to a photograph extracted from the previously verified ID.

51 Claims, 20 Drawing Sheets

Let's verify your identity

This process is designed to verify your identity and protect you from identity theft.

I declare that I am at least 16 years of age; I agree to the collection, processing and storage of personal information, including biometric data, by this platform for the purpose(s) of identity verification as required by the relevant data controller ☑ I agree to the above statement, and I have read this platform's Privacy Policy ⚠ Please start the verification promptly; the link will expire soon Cancel   Start Verification

FIG. 2A

Swift Verification With Reusable Data

Please select the record that is most closely aligned with your personal details. This action simultaneously grants this platform your consent to reuse your personal data stored within our systems for this verification.

| Name | Document Number | Date of Birth |
|---|---|---|
| Azb Eikn Qpfk | 333** | Jun 1983 |
| Ngt Qba | 55**3392** | Jun 1983 |
| T*f J**tv N*c lnky | 07324* | May 2006 |
| Ra Hsan Fyaz | 35481** | Feb 1994 |
| Z**ltq W*j | 23**715** | Jul 1981 |

Verify me with ID Documents

Choose your document issuing country

☐ Country — 301

Select document type for verification
Valid government issued document

National ID
Front and back side — 302

Passport
Photo Page

Driver's License
Front Side

Credit/Debit Card
Front Side

Don't have the required documents?

402 — [Selfie image]
⊙ Selfie

401 — ⊙ Data is currently hidden by default. To unhide the PII data, navigate to Settings > Security and Disable PII Data toggle button ✕

403 — ⋯ Request is currently under processing and awaiting completion (Pending)

Reference ID: sp-bc-prod-B4QKjv94  Verification URL: https://xxx.yyy.com
⊙ March 12th, 2024  ⊙ 5:50:16 am (UTC+00:00)  English
Browser Info: ⊙ 203.223.169.242  ⌂ Country, Capital of Country  ☐ Computer
⊙ Browser 122.0.0.0

Used Verification Services: ☺ Face  ▭ Document

404 — ▭ Document Verification
⊙ Document SelectedType         ⊙ Document Country Extracted      ⊙ Selfie On Document Matched
⊙ Document Name Extracted       ⊙ Document Date Of Birth Extracted ⊙ Document Issue Date Extracted
⊙ Document Expiry Date Extracted ⊙ Document Number Extracted       ⊙ Document Gender Extracted
⊙ DocumentAge Extracted         ⊙ Document Originality            ⊙ Document Visibility
⊙ Document Must Not Be Expired ⊙ Document Proof 405 — ▭ Document Information
First Name      Person Name              Full Name         ID Card
Last Name       Person Name              Expiry Date       Person Name
Date Of Birth   ⊞ 0000-00-00 (00 Years)  Document Number   ⊞ 0000-00-00
Issue Date      ⊞ 0000-00-00             Age               ⊞ 00000000
Gender          ⚲ M                      Personal Number   00  0000000000
Country         ☐ C

○ Data is currently hidden by default.To unhide the PII data, navigate to Settings > Security and Disable PII Data toggle button ✕

401 — ○ Verification has been successfully completed and accepted  (Accepted ✓)
*Note: User found in the existing verified users database*

Reference ID: sp-bc-prod-B4QKjv94  Verification URL: https://xxx.yyy.com
March 12th, 2024  5:50:16 am (UTC+00:00)  English
Browser Info: 203.223.169.242  Country, Capital of Country  Computer
Browser 122.0.0.0

402 — ○ Liveness Passed

Used Verification Services:  Face  Document

403 — Document Verification
○ Document SelectedType         ○ Document Country Extracted      ○ Selfie On Document Matched
○ Document Name Extracted       ○ Document Date Of Birth Extracted ○ Document Issue Date Extracted
○ Document Expiry Date Extracted ○ Document Number Extracted       ○ Document Gender Extracted
○ DocumentAge Extracted         ○ Document Originality             ○ Document Visibility
○ Document Must Not Be Expired 404 — ○ Document Proof 405 — Document Information

| | | | |
|---|---|---|---|
| First Name | Person Name | | ID Card |
| Last Name | Person Name | Full Name | Person Name |
| Date Of Birth | 0000-00-00 (00 Years) | Expiry Date | 0000-00-00 |
| Issue Date | 0000-00-00 | Document Number | 00000000 |
| Gender | M | Age | 00 |
| Country | C | Personal Number | 0000000000 |

FIG. 4B

IDENTITY VERIFICATION WITH REUSABLE PROFILES

BACKGROUND

Humans have identities. In a basic sense, an identity is who a person is. An identity signifies that a person "X" is recognized in a given community as person "X."

A person may need to prove their identity—e.g., to obtain a driver's license, get a library card, start a new job, enroll in a university, access medical records, travel internationally, etc. For another example, a person may walk into a bank to open a bank account in their name. To prevent fraud, the bank may need to verify that the person is not impersonating a different individual.

Generally speaking, to prove identity, a person may provide personally identifying information (e.g., a photo, name, date of birth, identifying number, etc.) that allows the receiving party to verify that the person is the claimed individual. Towards this end, a person may present a document such as a government-issued identification ("ID"), a national ID card, passport, birth certificate, social security card, driver's license, etc. Additional documents may be required to prove other aspects of identity. For example, a person may also need to present a utility bill, telephone bill, mortgage, rental agreement, insurance policy, loan statement, credit card, etc. that includes an address to prove residency in a particular state or city.

The complexities of identity verification are compounded in digital realms. As interpersonal, commercial, and governmental relationships increasingly occur online, verifying user identity is of paramount importance across a multitude of scenarios and use cases. Indeed, the need for fast and reliable identity verification techniques is heightened online given the capacity of digital technologies to facilitate malfeasance and identity theft. Just as a physical bank needs to verify the ID of a user opening an account, an online banking system must do the same. However, an online user may not want to visit a brick-and-mortar location to show their ID because doing so would be time-consuming and inconvenient. Thus, the bank must verify the user's identity behind the obscurity and anonymity of an Internet connection.

Moreover, ensuring compliance with a myriad of recent and diverse laws and regulations governing identity verification and privacy creates significant challenges for identity verification. These regulations differ by country, by state and objectives—to protect privacy, to prevent fraud, to prevent money laundering, for example. Perhaps, the best known such regulation is the General Data Protection Regulation ("GDPR"), which in the European Union establishes rules for the collection and use of personal data, including data that can be used for identity verification. The GDPR regulations were enacted recently in 2018, dramatically impacting not just EU countries, but having cross-border impacts across the globe. There are also a plethora of other regulations, such as anti-money laundering ("AML") and counter-terrorist ("CTF") regulations, Know your Customer regulations, and consumer privacy acts. In the United States in particular, states have enacted different privacy acts, such as the California Consumer Privacy Act, that are complex and have different requirements that vary by state. These complex and varying regulations impose significant, changing demands on identity verification systems.

Towards this end, identity verification ("IDV") platforms exist that verify a user's identity in online environments. IDV platforms may leverage a software-as-a-service ("SaaS") model and furnish application programming interfaces ("APIs") that technical entities across the digital landscape may access to verify users' identities. An IDV platform allows a wide-array of persons, businesses, organizations, governments, and other actors to remotely conduct transactions secure in the knowledge that the other party is indeed who they say they are.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 2A-2G are example screen displays of an interface that allows a user to complete an IDV process using reusable profiles, according to some embodiments.

FIGS. 3A-3G are example screen displays of an interface that allows a user to complete an IDV process by capturing and uploading an ID or other document, according to some embodiments.

FIGS. 4A-4B are example screen displays of a reporting page that includes a profile of a previously completed verification of an identity, according to some embodiments.

Figure 1:
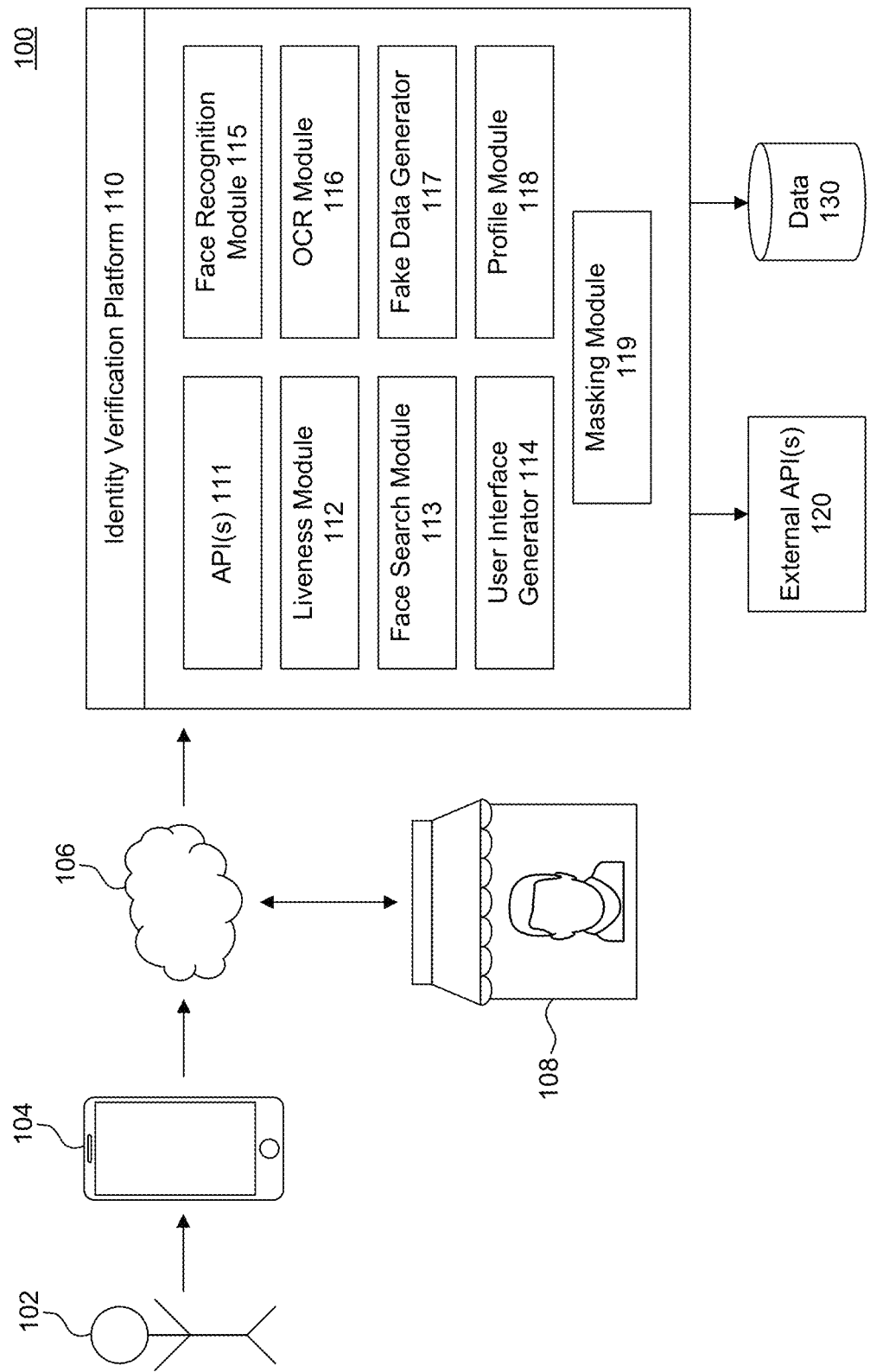
FIG. 1 is a block diagram of an environment implementing an IDV platform, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for employing reusable profiles in an IDV platform to verify a user's identity. The technique allows a user to verify their identity without re-capturing an image of an ID.

An IDV platform may operate as a trusted third-party that provides services, functions, and tools that businesses, organizations, users, and other actors may leverage to conduct transactions online. For example, if a user visiting a bank's website or using the bank's mobile application needs to have their identity verified, the bank can route the user to the IDV platform to complete a verification process. Upon successful verification of the user's identity, the IDV platform may return the user to the bank's website to complete the transaction. In the context of a bank, a transaction requiring identity verification may be opening a new account, closing an account, completing a large withdrawal, etc. But this is just one use case, and the scope of entities operating in online spaces that need to verify users' identities is broad and diverse. The transactions performed by these varied entities are expansive and open-ended. Such a system, business, merchant, or other entity seeking to verify a user's identity may be referred to below as a "requestor."

Traditionally, an IDV platform may employ a know-your-customer ("KYC") process to verify a user's identity. As part of a KYC process, the user may be asked to: (1) capture and transmit an image or images of one or more documents such as a government-issued ID, utility bill, credit card, passport, birth certificate, etc.; (2) capture and transmit an image or video of themselves (known colloquially as a "selfie" and referred to below as a "self-image"); and (3) confirm or provide identifying information such as full name, birth date, ID number, address, etc.

The IDV platform may extract a picture from the governmental ID and compare the picture to the self-image received from the user to ensure that the face in the self-image matches the face on the ID. The IDV platform may validate the ID in the received image by checking its authenticity and the integrity of the image. The authenticity check may examine the physical characteristics of the ID (e.g., data format, security features, checksums, watermarks, etc.). The IDV platform may also compare the ID to lists of documents known to be compromised and perform other suitable processing and security checks to validate the ID. The IDV platform may extract textual fields from the ID using optical character recognition ("OCR") and compare these fields to the user-provided or stored information to ensure that the fields match.

At the end of the KYC process, the IDV platform may determine that the ID is valid and that the human in the received self-image has the same face as the human on the ID. If these (and other) security checks are satisfied, then a successful verification result may be returned to the user and/or a requestor. The user may continue to complete the transaction at the requestor. Conversely, if the validation of documents or verification process raises red flags or otherwise fails, an appropriate error message may be returned to the user and/or the requestor indicating a failed verification.

However, KYC processes are imperfect and deficient in many respects. For one, KYC processes are slow and may take 60 seconds or longer to complete. To the user, the manually intensive steps of photographing a government ID, capturing a self-image, and providing corroborating information may be time-consuming and frustrating. This is especially true because the user may need to complete the KYC process each and every time that they verify their identity online, regardless of whether the user conducted business with the merchant previously.

Verifying a user through a KYC process is also computationally difficult and resource intensive. Online processes need to operate transnationally, and the format of IDs and other documents may differ across regions. IDs may display different information in different fashions. In many countries, the government may assign a person a uniquely and personally identifying national ID number at birth. However, other counties do not. Thus, IDV platforms need to employ appropriate ID-specific processing to appropriately parse and validate IDs. This drains resources and results in poor response times for users and merchants.

KYC processes are also unreliable. In part due to the differences in IDs, at times OCR may not successfully extract fields from an ID. Capturing a usable image of the government ID, especially the photograph, may be prove difficult due to lighting conditions. If the user is in a public place, in bad weather, or other inopportune location, capturing a workable image of an ID may be difficult, impractical, or impossible.

Some legacy tools have attempted to avoid performing a KYC process every time a user seeks to verify their identity. In one approach, legacy tools have installed cookies in a web browser on a user's device. The cookie may be referenced to determine whether or not the user had previously been verified by an IDV platform. But this is a flawed method given known problems with cookies—e.g., some users opt out and/or disable cookies. Additionally, many browsers have deprecated and/or will no longer support third-party cookies in the future. This cookie approach also does not work when the IDV platform serves as a trusted third-party because the IDV platform must rely on the requestors to verify the cookie information at the client and pass appropriate information in the request to the IDV platform. This requires modifying and harmonizing the behavior of all merchant tools using the IDV platform, which is not practical or feasible.

Some legacy tools have attempted to employ information-sharing consortiums to avoid performing a KYC process every time a user seeks to verify their identity. In such an approach, multiple merchants bind together through agreement to share data. By sharing appropriate data, a merchant may allow the verification of an ID performed at one merchant to apply to second merchant. However, this approach is unreliable and unworkable. The approach only functions for merchants that have agreed to share data and does work for external merchants. On a practical level, merchants are unlikely to agree to share user data with other merchants. Additionally, the approach operates only on the text-based information on documents and is thus limited in scope, use, and applicability. The approach is also less secure and vulnerable to manipulation by bad actors who only need access to text-based information about a user to impersonate them at a merchant in the consortium.

Briefly setting aside the deficiencies of legacy KYC processes, notable and profound advancements have recently occurred in facial recognition technologies. Specifically, advanced artificial intelligence ("AI") and machine learning techniques have emerged that allow faces to be identified and compared to other faces with reliability and efficiency at large scales. In essence, these AI tools operate by encapsulating a human face into a fixed-length string that allows for rapid and effective later comparisons between faces.

Prior to these recent advancements, facial recognition techniques might have been able to match a self-image to an ID to verify that a particular person was the same person as the person on the ID, but even this was time consuming. Moreover, the ability to match 1-to-N—i.e., a current self-image against a large number of prior images to determine a set of matches—with reliability and efficiency is a nascent, emerging technology.

The inventor's recognize that the intersection of these technologies—i.e., (1) techniques leveraged by digital, online IDV platforms and (2) recent advancements in facial recognition technologies driven by AI and machine learning—provides an opportunity to improve upon legacy technologies. Specifically, the experience of users and merchants in verifying an identity may be improved and streamlined using reusable profiles and by applying facial recognition techniques to subsequent IDV requests.

The disclosed technique is applicable when a user previously verified their identity with an IDV platform by providing a self-image and at least one document—e.g., when the user completed a KYC process. Upon verifying a user's identity through a KYC process, the IDV platform may create a "verified profile" that includes the user-provided self-image, an image of the ID, and other information (described in greater detail below). The IDV platform adds the verified profile to a repository of all previously verified profiles. This repository of verified profiles includes verified profiles representing every successful identity verification regardless of the merchant.

Then, when the same user later seeks to have their identity verified, the IDV platform may verify the user's identity using only a new self-image. While this disclosure will frequently refer to the self-image as a single image, the techniques discussed below apply equally to videos (which can be thought of as series of images). But in any event, the user need only capture and upload an updated self-image to complete the identity verification process (no ID or other corroborating document needs to be provided).

To accomplish this, the IDV platform compares the new self-image to all previously captured images in the repository of previously verified profiles, matching a face of the user in the new self-image to the faces in the previously verified profiles. The IDV platform determines a matching profile where the new self-image matches a face in the previously verified profiles, subject to various parameters that specify the information required by a particular merchant/requestor. If more than one face match is found in the previously verified profiles, then the IDV platform may select the most recent matching profile as the matching profile. The IDV platform may retrieve data from the matching profile including the previously captured ID, the previously captured self-image, and user-specific information.

To enhance security and accuracy, the IDV platform may enforce an additional knowledge-based authentication check by presenting information from the matching profile to the user alongside fake, computer-generated profile data that resembles actual user information. If the user selects the information from the matching profile (as opposed to incorrect, fake profile data), this can be used as evidence that the user knows their personal information. This ensures that a false identification was not made originally when matching the new self-image to a prior self-image in the previously verified profiles and protects against brute force attacks.

As an additional safeguard, the IDV platform may compare the new self-image to a photo extracted from the previously captured ID in the matching profile. This provides additional security against a brute-force attack or a false positive occurring in the 1-to-N search. While such a false positive may be extraordinarily rare given the accuracy of the AI face recognition technique, even a rare false positive is not acceptable in the context of identity verification. On the basis of these checks, the IDV platform may return a successful verification of the user's identity. If any of these steps is unsuccessful (e.g., if no matching profile is found, if the user selects a fake profile, or if the new self-image does not match the face in the previously captured ID), then the user may be routed to a traditional KYC process to verify their identity.

Notably, by employing reusable profiles, the IDV platform allows the user to skip entirely the step of capturing and providing a government ID for subsequent verifications. Moreover, reusable profiles may be leveraged at any merchant that uses the IDV platform, allowing the user to verify their identity once in a manner that applies widely to multiple merchants. So if a user verifies their identity during a transaction with a bank that uses the IDV platform, the same user may later verify their identity during a transaction with a government agency that uses the IDV platform. A verification using a reusable profile is also more reliable because it is not subject to the problems inherent in capturing an image of an ID (e.g., imperfect lighting, bad weather, etc.). In the end, this saves time and results in increased user satisfaction.

The technique benefits merchants as well. Merchants want to verify legitimate users as quickly and accurately as possible because a merchant may lose customers if a false positive or false negative occurs when verifying a user's identity. The disclosed technique reduces onboarding time, improves pass rates, and reduces enrollment drop-offs. In the end, this translates into revenue gained for businesses.

No legacy technique or system provides a solution that allows a user to verify their identity based on a previously completed verification using a reusable profile without re-capturing an image of an ID or other document. As discussed above, receiving a selection by a user of a matching profile in a list of fake profiles further secures the transaction using knowledge-based authentication, ensuring that a false identification was not made by the facial recognition when retrieving a prior profile. However, if a false identification occurred, the information displayed to the user would reveal the personally identifying information of another user, which is not acceptable for data security reasons. Thus, a further technical benefit may be achieved by masking the displayed information such that the user may still recognize their own profile information, but such that a user does not accidentally gain access to another user's personally identifying information. This avoids data breaches.

A further technical benefit may be achieved by matching the face in the self-image to the document ID in parallel with the user selecting the profile from among the fake profiles. As discussed above, the IDV platform may compare the new self-image to a photo on the previously captured ID associated with the matching profile to provide an additional security check. However, this comparison may take multiple seconds to complete because the IDV platform needs to extract the photo from the previously captured ID and then compare the photo to the new self-image. By running these steps in parallel, the IDV process may be further optimized and save users still more time.

A further technical benefit may be achieved by tracking user verifications as multiple, independent profiles. Instead of retaining a single, reusable profile for a user, each successful verification may be stored and memorialized as a distinct verified profile. In an embodiment, the most recent profile may be selected as the matching profile when multiple profiles match the new self-image of the user. However, the use of independent profiles may be extended to accommodate differing requirements across different merchants—e.g., some merchants may verify a user's identity with only a date of birth and a name while others may need to verify an address. Thus, a particular merchant may mandate the capture and verification of a utility bill having an address in addition to an ID. Some organizations may require the back side of an ID as part of the validation processes while others do not. Given these distinctions, a particular profile may be selected from multiple matching profiles that satisfies the requirements of a particular merchant. These different requirements may be passed as parameters to the APIs provided by the IDV platform. If no existing profile satisfies received parameters, the IDV platform may perform a KYC process to capture the requisite documents captured and information. Future requests from other merchants requiring similar parameters may then be satisfied using the enhanced/newly created profile.

A further technical benefit may be achieved when confirming that the user consents to use their data to perform identity verification with a reusable profile. When verifying a user's identity through a KYC process, an IDV platform may receive consent from a user to process and store their personal information such as the self-image and captured IDs. An example of such a consent form is discussed below with reference to FIG. 2A. However, user consent may be limited to apply to an initial KYC process or a one-time use of user information. In a practical sense, it is difficult to get the user to understand or consent to a future, off-the-horizon use of their data during an initial verification. Thus, a need exists to receive supplemental consent from the user for the purposes of identifying their identity using the reusable profiles and to do so seamlessly within the reusable-IDV process. Accordingly, a further technical benefit may be achieved by displaying consent information simultaneously with the selection of a profile from the displayed fake-profile data. An example of such a profile page having integrated consent information is discussed below with reference to FIG. 2E. These and other technical benefits are discussed below with reference to the figures.

FIG. 1 is a block diagram of environment 100 implementing an IDV platform, according to some embodiments. As illustrated in FIG. 1, environment 100 may include user 102, device 104, network 106, requestor 108, IDV platform 110, external API(s) 120, and data 130.

User 102 may be an individual conducting an online transaction. User 102 may be a human being have an identifiable and unique face or likeness. User 102 may be a member of a business, organization, or other suitable group. User 102 may be a customer of an online bank that is opening a new account, closing an account, completing a large withdrawal, etc. User 102 may be a gamer making an in-game purchase, an investor, a digital currency or forex trader, a user of a governmental agency's website, or any other suitable individual seeking to have their identity verified in the course of conducting a transaction online.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 1 as a single computer, one skilled in the art(s) will understand that device 104 may represent two or more computers in communication with one another. Therefore, it will also be appreciated that any two or more components of device 104 may similarly be executed using some or all of the two or more computers in communication with one another. For example, user 102 may commence an IDV process on a first device that does not have a camera and transfer the process to a second device having a camera to allow user 102 to capture a self-image for verification purposes.

Network 106 may be any network or combination of networks including the Internet, a local area network (LAN), a wide area network (WAN), a wireless network, a cellular network, or various other types of networks as would be appreciated by a person of ordinary skill in the art. Network 106 may allow device 104, requestor 108, and identity verification platform 110 to communicate, e.g., using HTTP requests/responses.

Requestor 108 may be a business, organization, government agency, or other entity. In an embodiment, requestor 108 conducts transactions with user 102 over network 106. Requestor 108 may be a customer of IDV platform 110— e.g., requestor 108 may be an online bank, a marketplace, a department of motor vehicles or other governmental agency, a gaming platform, or any other suitable entity seeking to verify an identity of a user in an online environment.

IDV platform 110 may verify users' identities in online environments. IDV platform 110 may leverage a SaaS model and provide, deliver, and support APIs and UIs to requestor 108 and/or user 102. IDV platform 110 may operate transnationally to programmatically validate IDs from various regions in the world. As discussed in detail below, IDV platform 110 may build and leverage reusable profiles to allow user 102 to verify their identity without re-capturing an image of an ID or other document. IDV platform 110 may include API(s) 111, liveness module 112, face search module 113, user interface ("UI") 114, face recognition module 115, OCR module 116, fake data generator 117, profile module 118, and masking module 119.

API(s) 111 may provide distinct functions that allow requestor 108 to verify an identity of user 102 using IDV platform 110. API(s) 111 may provide definitions, specifications, endpoints, protocols, contracts-of-service, etc. that allow requestor 108 to commence and complete IDV during an online transactions. Interactions between requestor 108 and API(s) 111 may include requests from requestor 108 and/or user 102 and responses returned by API(s) 111 to requestor 108 and/or user 102. For example, API(s) 111 may allow requestor 108 to send a request to commence an ID verification process including supported parameters. At the end of the process, API(s) 111 may include return a response to requestor 108 that indicates a verification result of true or false. The process of verifying an identity may be divided into multiple APIs, micro-services, sub-functions, modules, etc. in fashions and manners that will be understood by one skilled in the relevant art(s). In an alternative embodiment, API(s) 111 may expose endpoints that give requestors access to the backend technologies provided by profile module 118 and face search module 113 without providing a particular UI directly to user 102. Liveness module 112 may verify the "liveness" of a self-image. The "liveness" may be thought of as the authenticity of the self-image. By verifying the liveness of an image, liveness module 112 may safeguard against deep-fake and spoofing attacks (e.g., a malicious user submitting a picture of a different user, wearing a mask of a user, using AI-generated images, etc.). Liveness module 112 may perform active liveness and passive liveness checks. An active liveness check may examine specific actions performed by a user such as blinking or nodding. Active liveness may more readily apply to captured videos. Passive liveness checks may analyze facial characteristics to detect manipulation without requiring user interaction. Liveness module 112 may identify features of the self-image and compare the features to known potential security risks to validate the authenticity of a self-image. Known potential security risks include: a face mask attack, a paper image detection, a deep fake, a static image attack, a virtual camera based-attack using a pre-recorded video, an artificial-intelligence-generated image attack, etc. In one embodiment, liveness module 112 may be structured as an API call or micro-service request that receives a photo as a parameter and returns a true/false result regarding the liveness of the photo.

Face search module 113 may perform a 1-to-N search that matches a self-image contemporaneously captured by user 102 against previously captured images of validated users stored in verified profiles. These verified profiles are discussed in further detail below, but in general, a verified profile may be created when a user is successfully verified using a KYC process. The verified profile may include a user-provided self-image, an image of a captured ID, information provided by the user, and other suitable information. In an embodiment, face search module 113 may be structured as an API or micro-service request that receives a photo as a parameter and returns a result including a true/false result regarding whether a matching profile exists, a reference to the matching profile, a list or other data structure of matching profiles, and/or other suitable result.

UI generator 114 may be employed by IDV platform 110 to render UIs for user 102. Example UIs are discussed below with reference to FIGS. 2A-2G, 3A-3G, and 4A-4B. UI generator 114 may create and transmit appropriate interface components, templates, stylesheets, etc. to realize the IDV techniques disclosed herein as will be understood by one skilled in the relevant arts. Components may be generated server-side and transmitted to device 104, generated on device 104 using client-side techniques, or compiled using a hybrid of these two approaches. In an embodiment, UI generator 114 may provide client-side libraries that control dynamic interactions between user 102 and IDV platform 110.

Face recognition module 115 may perform a 1-to-1 comparison of an image of a face to another face in several contexts. Face recognition module 115 may perform a comparison between a self-image and a photo extracted from a governmental ID. Face recognition module 115 may also perform a comparison between a self-image and a previously captured self-image stored in a verified profile. In some embodiments, face recognition module 115 may perform facial recognition in accordance with a configurable match tolerance. A match tolerance may provide a measure of how much "distance" (i.e., a quantitative degree of similarity) there can be between faces to be considered a matching by face recognition module 115. By using a match tolerance, face recognition module 115 may require higher certainty for some matches than for others. The match tolerance may be adjusted based on the nature of a particular transaction, the successful completion of a secondary authentication method, and other relevant factors. In one embodiment, the match tolerance may be adjusted based on a behavioral biometric—e.g., an angle of a head in the image, a user manner of presenting their face in an oval presented on a screen, a manner of typing, a browser footprint, a camera resolution, or a cognitive assessment.

OCR module 116 may extract various fields from an ID using OCR by converting fields on an image of the ID into a machine-readable text format. Towards this end, OCR module 116 may store and deploy individual processing templates for each type of document (such as IDs) supported by IDV platform 110. For example, OCR module 116 may extract a full name, date of birth, ID number, etc. from an image captured by a user of an ID.

Fake data generator 117 may generate fake profile data to display along with information from a retrieved profile as part of the knowledge-based verification. Fake profile data may resemble user information for a real user, but fake data generator 117 may create randomized, computer-generated information that does not correspond to any actual user.

Profile module 118 may store verified profiles that represent prior verifications of a user. A verified profile may include a user-provided self-image, an image of a captured ID, information provided by the user, and other suitable information. In an embodiment, profile module 118 may leverage face search module 113 to create a fixed-length byte string representation of a user's face and store the fixed-length byte string in a verified profile for later comparison. FIGS. 4A-4B discussed below display additional information that may be included in a verified profile by profile module 118.

Masking module 119 may mask displayed information on a profile page that displays an actual profile and one or more fake profiles. Marking module 119 may mask the information such that user 102 may still recognize their own profile information but not able to view in entirety another user's personally identifying information. For example, masking module 119 may obscure a subset of characters in the information displayed on a profile page (such as discussed below with reference to FIG. 2E). For example, if displaying a name, a document number, and a date of birth, the name and the document number, masking module 119 may replace sets of characters in the name and document number with asterisks or other suitable character to obfuscate the personally identifying information.

External API(s) 120 may be leveraged by IDV platform 110 to perform a variety of additional security checks on a captured image of a document. For example, external API(s) 120 may be a governmental website or API that verifies that a government ID was not a prior victim of identity theft. Such an external API(s) 120 may reference lists of documents that have been compromised.

Data 130 may be a variety of stored information relevant to users, merchants, verified profiles, etc. stored and used in IDV platform 110. Data 130 may be housed or stored in a relational database, a NoSQL database or other horizontally scaling database, a digital ledger technology or blockchain, or any other suitable storage mechanism. For instance, IDV platform 110 may harness any commercially available database management system to store and retrieve data. In an embodiment, data 130 may be stored in a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, data 130 may include a hard-disk interface, such as ATA, SATA, SCSI, SAS, and/or fibre for interfacing with storage mediums.

FIGS. 2A-2G are example screen displays of an interface that allows a user to complete an IDV process using reusable profiles, according to some embodiments. Using this (or a similar) interface, the user may verify their identity without re-capturing an image of a governmental ID or other document. The screen display provided in screen display 200A-200G are merely exemplary, and one skilled in the relevant art(s) will appreciate that many approaches may be taken to provide suitable interfaces in accordance with this disclosure. In addition, IDV platform 110 may expose endpoints via API(s) 111 that provide access directly to the backend functions offered by profile module 118 and face search module 113. Thus, the reusable profiles may be leveraged by requestor 108 without IDV platform 110 directly providing a particular UI directly to user 102.

FIG. 2A is an example screen display 200A of an initial page in an IDV process. In screen display 200A, user 102 may receive informed consent to the use of their data for the purposes of verifying their identity. Screen display 200A may be an initial page in both/either an identity verification process using reusable profiles and/or a KYC process. As illustrated in FIG. 2A, screen display 200A may include initial consent agreement 201, acceptance selection 202, buttons 203.

Initial consent agreement 201 may inform a user about the purposes for which their data will be used. This information may allow a user to knowingly and willingly consent to the use of their data for the purposes of identity verification. The example provided in FIG. 2A is merely exemplary and initial consent agreement 201 may take other forms. But in the exemplary screen display 200A, initial consent agreement 201 reads: "I declare that I am at least 16 years of age; I agree to the collection, processing and storage of personal information, including biometric data, by this platform for the purpose(s) of identity verification as required by the relevant data controller."

Acceptance selection 202 may allow a user to indicate their consent to a privacy policy. Acceptance selection 202 may include a checkbox or other suitable mechanism for receiving input from user 102 as would be understood by one skilled in the relevant art(s). The example provided in FIG. 2A is merely exemplary and acceptance selection 202 may take other forms. But in the exemplary screen display 200A, acceptance selection 202 reads: "I agree to the above statement, and I have read this platform's Privacy Policy." Acceptance selection 202 may also include a link to a Privacy Policy or other information allowing user 102 to make an informed decision about the use of their personal data.

Buttons 203 may allow user 102 to commence the identity verification process or cancel the process. In an embodiment, buttons 203 may be disabled until user 102 indicates consent to the use of their data using acceptance selection 202.

Figure 2B:
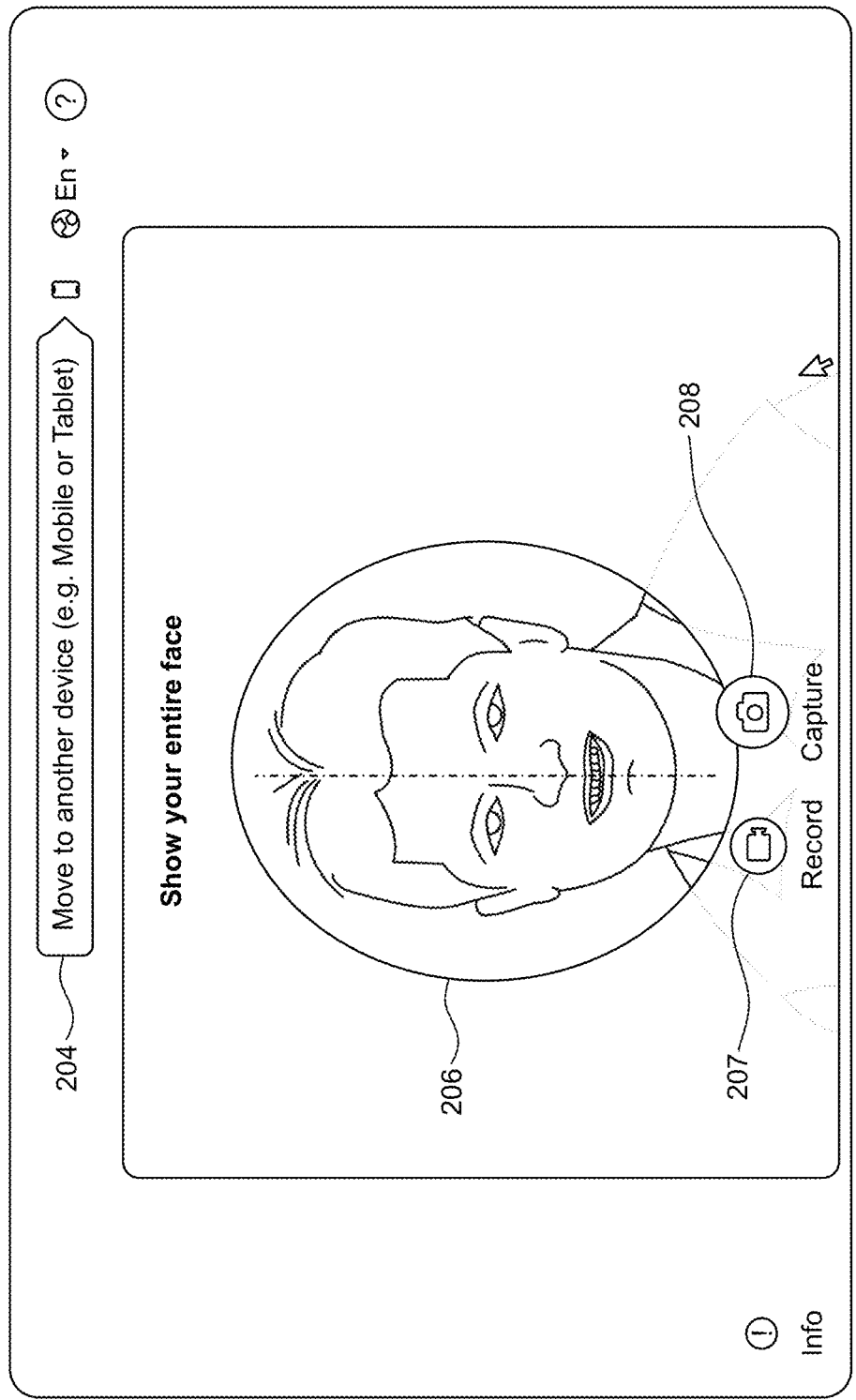

FIG. 2B is an example screen display 200B of a screen in the identity verification process in which user 102 captures a self-image using a camera available on device 104, according to some embodiments. As illustrated in FIG. 2B, screen display 200C may include viewfinder 206, record button 207, and capture button 208.

Viewfinder 206 may be displayed to user 102 to guide the user in positioning their face in an appropriate boundary. Viewfinder 206 may be a circle, oval, rectangle, etc. and may indicate to user 102 an appropriate place within the screen capture to position their face to ensure that device 104 captures a self-image that is usable by IDV platform 110.

Record button 207 may allow user 102 to record a video for use as a self-image. Capture button 208 may cause a camera on device 104 to capture the self-image of user 102.

Figure 2C:
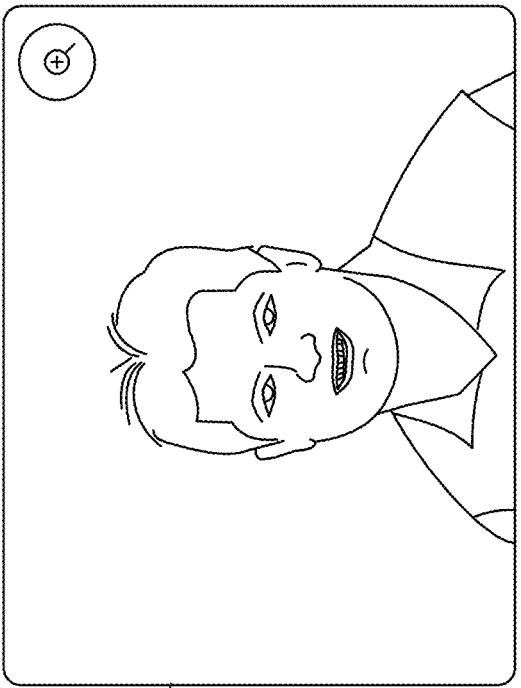

FIG. 2C is an example screen display 200C of a screen in the identity verification process in which user 102 captures a self-image using a camera available on device 104. As illustrated in FIG. 2C, screen display 200C may include relocate button 204 and captured image 205.

Relocate button 204 may allow user 102 to transfer the process from device 104 to a different device. This may be desirable to user 102 when a particular device being used does not have a camera. A user selection of relocate button 204 may result in a link being generated, an email being sent, or other suitable action that allows user 102 to quickly and easily transfer the IDV process to a different device.

Captured image 205 may be an image of the user as currently captured by a user-facing camera on device 104. Captured image 205 may allow user 102 to ensure that their face is currently being captured by a camera on device 104 for the purposes of capturing a self-image for use in the IDV process.

Figure 2D:
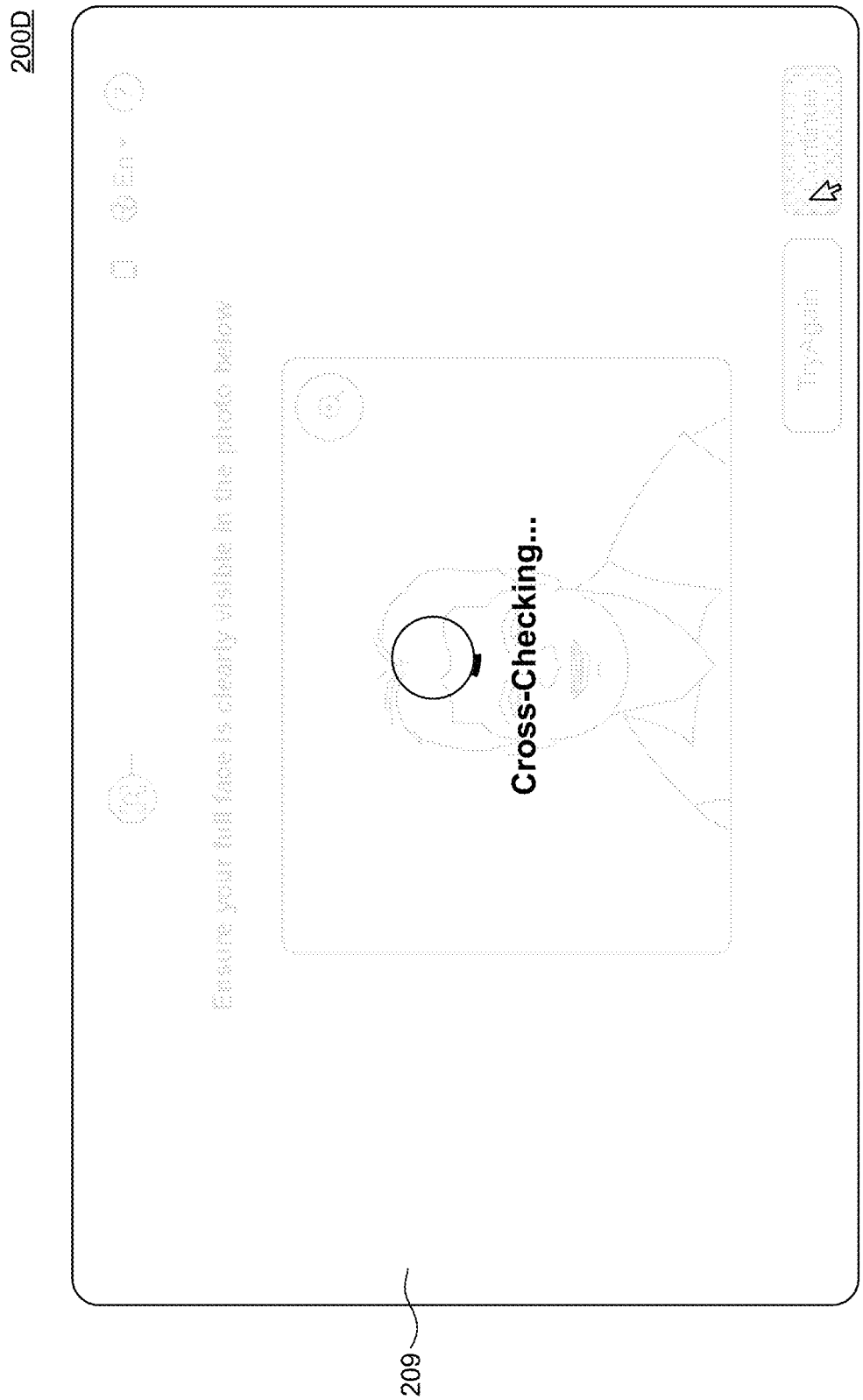

FIG. 2D is an example screen display 200D illustrating a loading screen that indicates steps being performed by IDV platform 110 after user 102 captured a self-image. As illustrated in FIG. 2D, screen display 200D may include loading screen 209 that may indicate various steps that IDV platform is performing with the captured self-image. In the exemplary embodiment of screen display 200D, loading screen 209 displays "cross-checking," indicating that IDV platform and/or face search module 113 are comparing the captured self-image to the repository of verified profiles to determine a matching profile. However, other steps may be displayed to user 102 to inform the user that IDV platform 110 is actively processing the self-image and actively completing the IDV process.

FIG. 2E is an example screen display 200E that facilitates that use of a knowledge-based authentication check to ensure that a false identification was not made when matching the new self-image to a prior self-image in the previously verified profiles. Screen display 200E presents information from a matching profile to the user alongside fake profile data. As illustrated in FIG. 2E, screen display 200E may include inline consent agreement 210, fake profile data 211A, masked profile information 211B, and navigation button 212.

As discussed in further detail below with reference to FIG. 5, a matching profile may be selected by comparing a new self-image captured by user 102 to all previously captured images in the repository of previously verified profiles. This matching profile may be a verified profile for a user matching the face in the new self-image captured by user 102.

Inline consent agreement 210 may inform a user about the purposes for which their previously gathered profile information will be used. Because initial user consent may only apply to a first KYC process or a one-time use of user information, subsequent uses of the data may require supplemental consent from the user to comply with privacy laws and to build trust with users. Accordingly, inline consent agreement 210 displays above, alongside, near, etc. the fake and matching profile information. This allow user 102 to both grant consent and select a matching profile from a single interface page. The example provided in FIG. 2E is merely exemplary and inline consent agreement 210 may take other forms. But in the exemplary screen display 200E, inline consent agreement 210 reads: "Please select the record that is most closely aligned with your personal details. This action simultaneously grants this platform your consent to reuse your personal data stored within our systems for this verification."

Fake profile data 211A may be created by fake data generator 117 to resemble actual user data without actually being personally identifying information of an actual individual. In the exemplary display in screen display 200E, there are four rows of fake profile data and one row of the actual matching profile. However, more or less rows of fake data may be generated and displayed as fake profile data 211A. Fake profile data 211A may be masked by masking module 119 to resemble the information from the matched profile. Though there is no need to mask the fake profile data for data security measures, the data needs to be masked to match masked profile information 211B to provide an effective knowledge-based authentication. Notably, if the user selects a fake profile from within fake profile data 211A, then user 102 may be routed to a KYC process that requires capturing and uploading an image of an ID or other document.

Masked profile information 211B may be information retrieved from a matched profile that is obscured by masking module 119 in such a way that user 102 may identify the appropriate row as matching their data without exposing personally identifying information in its entirety. Masked profile information 211B obscures a subset of characters in the information displayed with asterisks in FIG. 2E, but other characters may be used to achieve this masking. In the exemplary screen display 200E, masked profile information 211B has been selected by the user (resulting in the box around the record that indicates a user selection).

Navigation button 212 may allow user 102 to exit the IDV process using reusable profiles. Selection of navigation button 212 may route the user to a KYC process which may require capturing and uploading an image of a governmental ID. Such a process is described in further detail below with reference to FIG. 6.

Figure 2F:
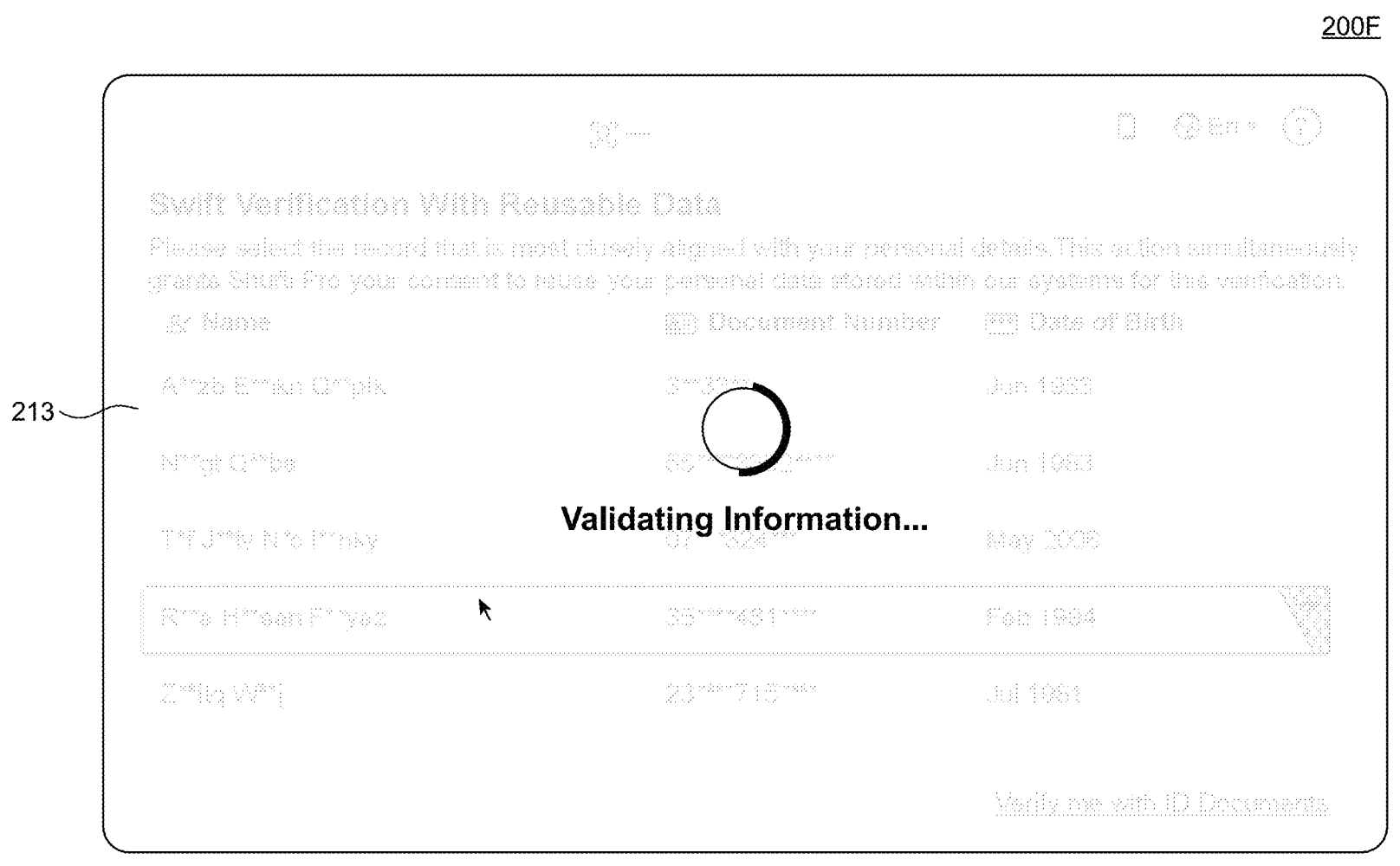

FIG. 2F is an example screen display 200F that may be displayed to user 102 after the user selects the matching profile. As illustrated in FIG. 2F, screen display 200F may include validating screen 213 that informs user 102 that IDV platform 110 is processing the request. Other steps may be displayed to user 102 to inform the user that IDV platform 110 is actively processing the IDV request.

Figure 2G:
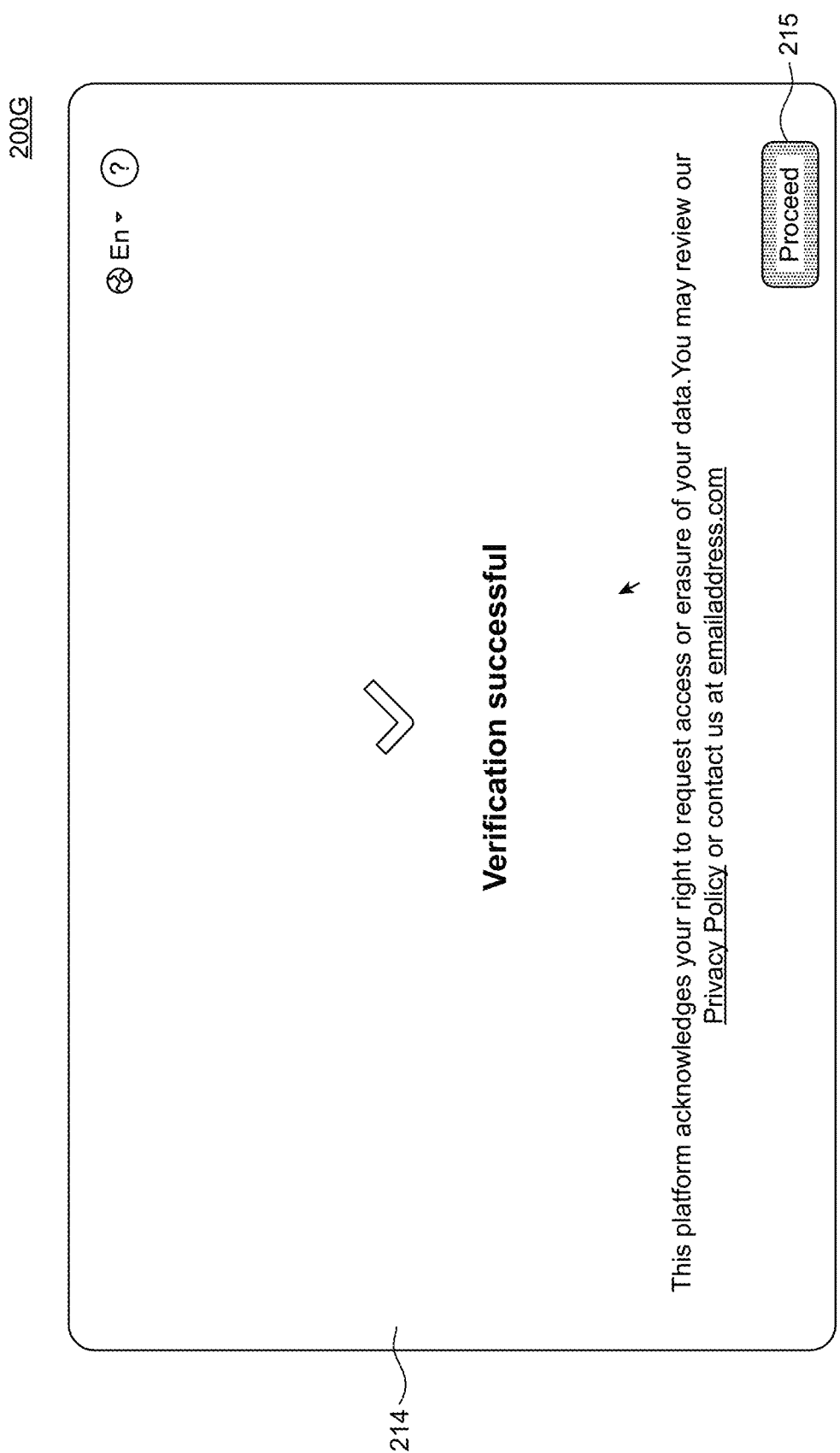

FIG. 2G is an example screen display 200G that illustrates the result of the verification process. As illustrated in FIG. 2G, screen display 200G may include verification result 214 and proceed button 215.

Verification result 214 may display the results of the verification process. In FIG. 2G, the verification is successful, and verification result 214 includes a checkmark and notes "Verification successful." Verification result 214 may also display a failed verification message that includes an x-mark or other indicator, notes "Verification unsuccessful" and lists a reason or reasons for the failed verification.

Proceed button 215 may return user 102 to requestor 108 to complete the transaction being conducted. In an embodiment, user 102 may be routed back to requestor 108 without requiring an input on proceed button 215—i.e., a successful verification may result in the user being automatically returned to the referring technical system.

FIGS. 3A-3G are example screen displays of an interface that allows a user to complete an IDV process by capturing and uploading an ID or other document, according to some embodiments. A successful verification of an identity of a user may result in the creation of a verified profile in a repository of reusable profiles. The screen display provided in screen display 300A-300G are merely exemplary, and one skilled in the relevant art(s) will appreciate that many approaches may be taken to provide suitable interfaces in accordance with this disclosure.

FIG. 3A is an example screen display 300A illustrating an initial step in the identity verification process using a ID document. As illustrated in FIG. 3A, screen display 300A may include country selector 301 and document type 302. Country selector 301 may allow user 102 to select an issuing country of an ID or other document. Document type 302 may allow user 102 to select a document type to be captured and transmitted. In the exemplary embodiment of FIG. 3A, document type includes a national ID, a passport, a driver's license, and a credit/debit card. However, other suitable types of documents may be processed by IDV platform 110 and displayed as options in document type 302. Moreover, the types of documents in document type 302 may dynamically vary based on the selection of a country in country selector 301—i.e., IDV platform may process certain document types in a first country and different document types in a second country.

Figure 3B:

FIG. 3B is an example screen display 300B for capturing the front side of an ID. Screen display 300B displays an interface page displaying after a user selects "National ID" from document type 302 in screen display 300A. As illustrated in FIG. 3B, screen display 300B may include front capture 303 that may be an image of the front side of an ID or other document such as a passport, driver's license, or credit card.

Figure 3C:
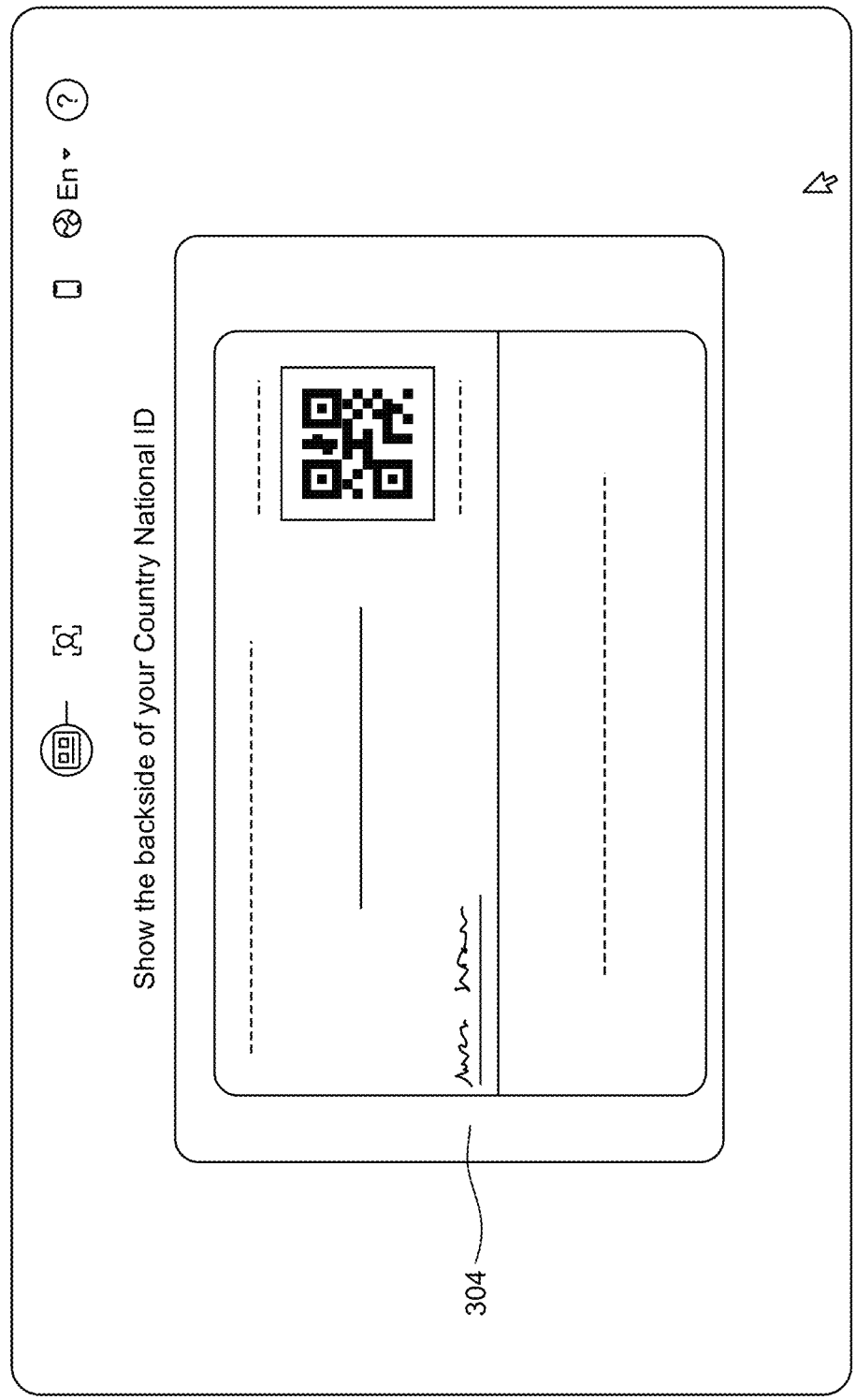

FIG. 3C is an example screen display 300C for capturing the back side of a national ID or other document. As illustrated in FIG. 3C, screen display 300C may include back capture 304 that may be an image of the back side of an ID or other document such as a passport, driver's license, or credit card.

Figure 3D:
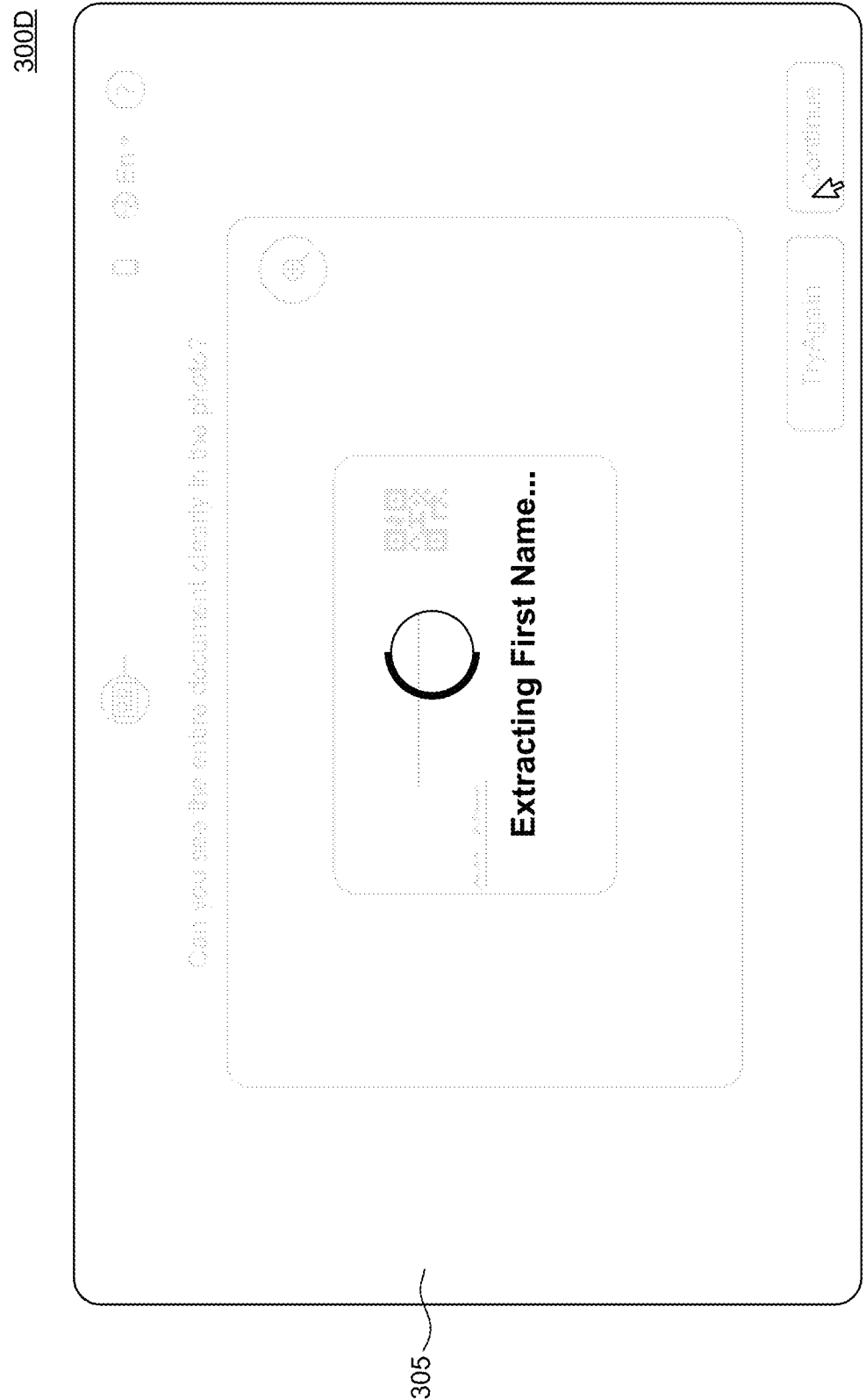

FIG. 3D is an example screen display 300D of a loading screen displayed to user 102. As illustrated in FIG. 3D, screen display 300D may include extracting message 305, which indicates to user 102 one or more fields that are being extracted from an uploaded document using OCR.

Figure 3E:
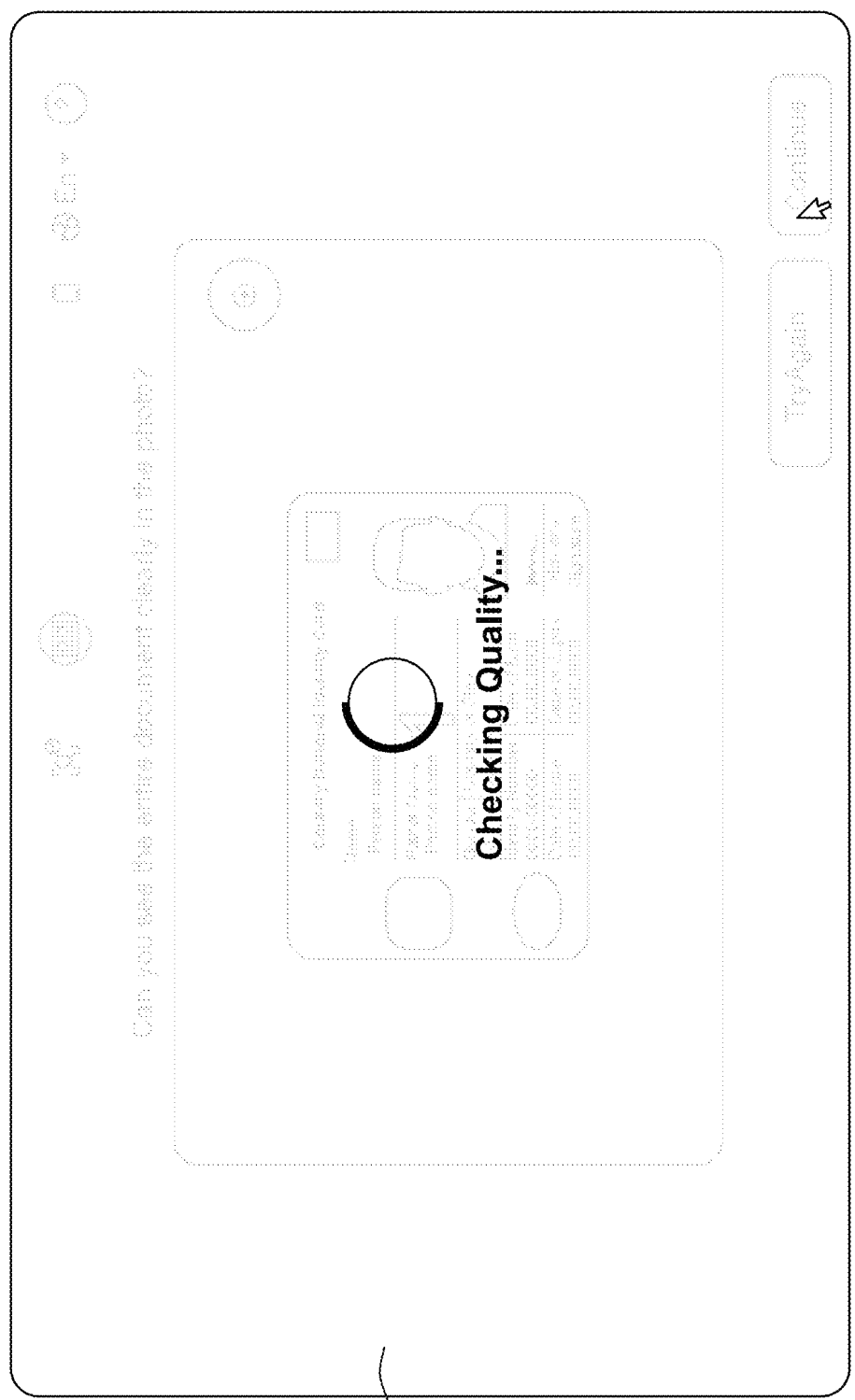

FIG. 3E is an example screen display 300E of an alternative loading screen displayed to user 102. As illustrated in FIG. 3E, screen display 300E may include quality check message 306 may indicate one or more steps being performed by IDV platform 110 to validate the authenticity of the uploaded document and/or a transmitted self-image.

Figure 3F:
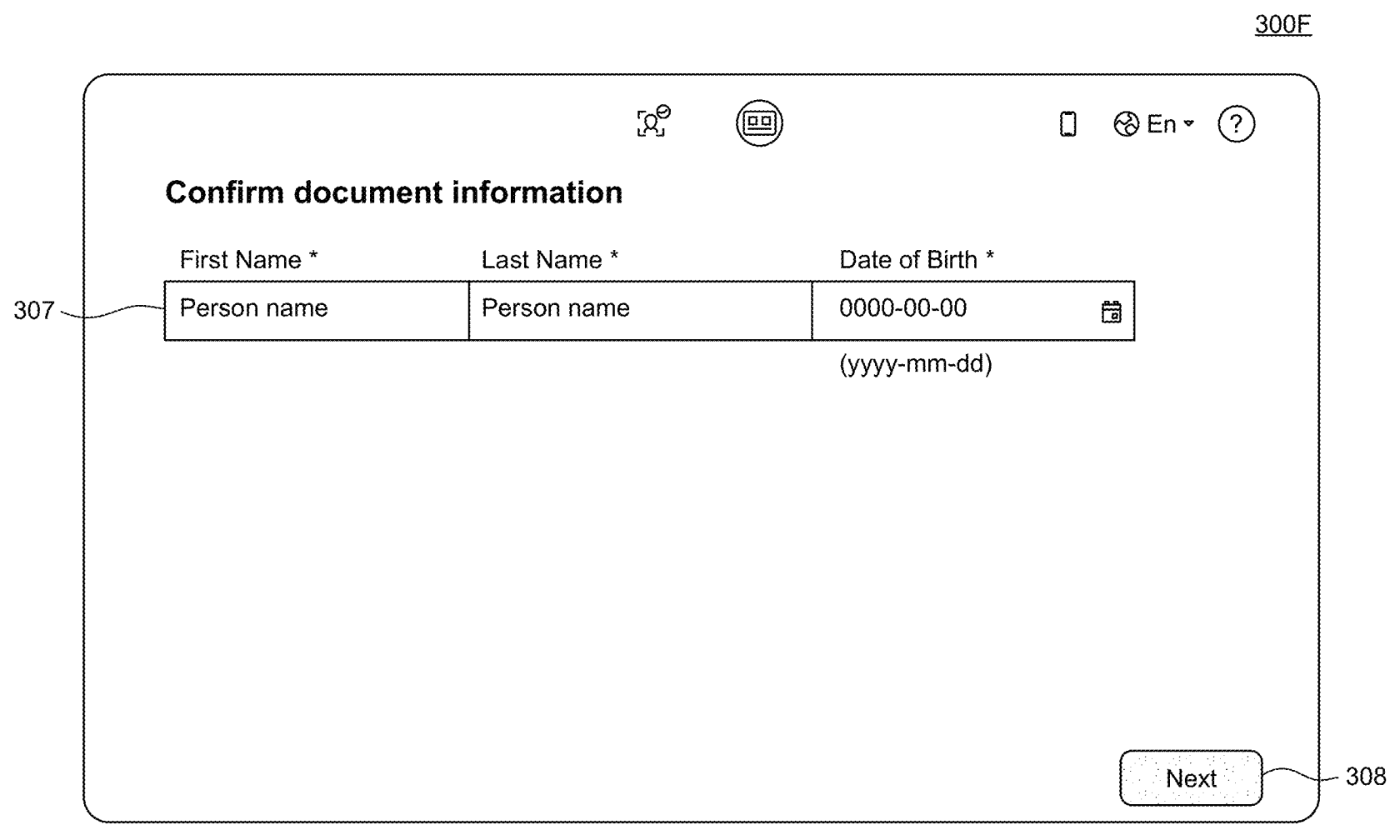

FIG. 3F is an example screen display 300F that displays one or more fields extracted from the ID using OCR for verification by user 102. As illustrated in FIG. 3F, screen display 300F may include extracted information 307 and next button 308. Extracted information 307 may be one or more fields extracted by OCR module 116 from an ID or other document. Extracted information 307 may display the one or more fields in a row to allow user 102 to easily verify that the extracted information is correct. Next button 308 may allow user 102 to proceed to a subsequent step in the verification process.

Figure 3G:
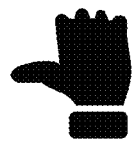

FIG. 3G is an example screen display 300G displaying a verification result of the process. As illustrated in FIG. 3G, screen display 300G may include verification result 309. Verification result 309 may display a result of the verification process. In FIG. 3G, the verification is successful. Verification result 309 may also display a failed verification message and a reason or reasons for the failed verification. Verification result 309 may also include a link to the reports page which displays more details about the verification. In another embodiment, user 102 may be routed back to requestor 108 without viewing verification result 309.

FIGS. 4A-4B are example screen displays of a reporting page that includes a profile of a previously completed verification of an identity, according to some embodiments. The screen display provided in screen display 400A-400B are merely exemplary, and one skilled in the relevant art(s) will appreciate that many approaches may be taken to provide suitable interfaces in accordance with this disclosure.

FIG. 4A is an example screen display 400A of a reporting page displaying a pending verification of an identity, according to some embodiments. As illustrated in FIG. 4A, screen display 400A may include request status 401, self-image 402, details 403, services provided 404, and document information 405.

Request status 401 may display a status of a previously completed IDV request. In screen display 400A, the request is pending. Self-image 402 may a self-image associated with the profile, i.e., a self-image captured during the previous identity verification request. Details 403 may display a variety of information about the previously completed identity verification request—e.g., a timestamp, a referrer, browser information, etc. Services provided 404 may be steps performed by IDV platform 110 as part of the previously identity verification request and a pass/fail indicator regarding the performance of that step. Document information 405 may be one or more fields extracted from the ID using OCR.

FIG. 4B is an example screen display 400B of a reporting page displaying a previously completed verification of an identity, according to some embodiments. Screen display 400B may include successful request 406 that indicates that the user was successfully verified. Successful request 406 may also indicate whether the user was verified using a KYC process or a reusable profile. In the exemplary screen display 400B, successful request 406 indicates the latter by noting that "User found in the existing verified users database."

Figure 5:
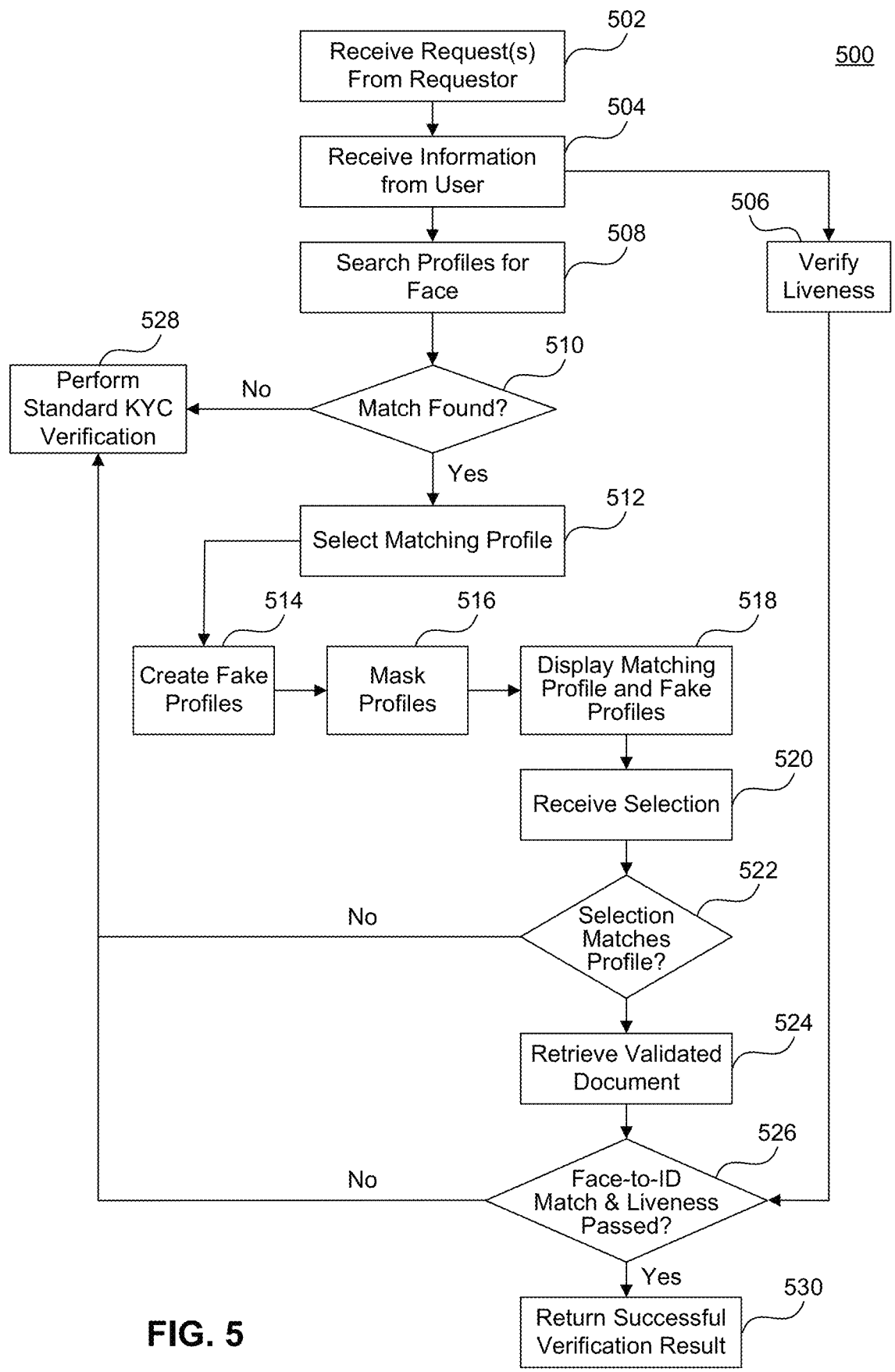
FIG. 5 illustrates a method for verifying an identity using reusable profiles, according to some embodiments.

FIG. 5 illustrates a method 500 for verifying a user identity using reusable profiles, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, IDV platform 110 may receive a request from a requestor to verify the identity of a user—i.e., user 102 may be engaged in an online transaction with requestor 108. For example, the requestor may be a bank, government agency, gaming platform, e-commerce platform, etc. that needs to verify that the user is who they claim to be. IDV platform 110 may provide a software-as-a-service (SaaS) model that provides various application programming interfaces (APIs) that the requestor may access to effectively pass the user to IDV platform 110. While this is referred here to as a singular "request," such a hand-off divided into multiple API calls, micro-services, sub-functions, modules, etc. in fashions and manners that will be understood by one skilled in the relevant art(s).

In 504, IDV platform 110 may guide user 102 through a process that gathers requisite information from user 102. As discussed above with reference to FIG. 2A, this may include receiving consent from user 102 to complete an IDV process. As discussed above with reference to FIGS. 2B-2C, this information may also include a self-image captured by a camera on device 104. Though referred to as a self-image, a captured image may be a video or a series of images. Below, this self-image will be referred to as the "current self-image." In an alternative embodiment, IDV platform 110 may expose endpoints via API(s) 111 that give user 102 and/or requestor 108 access to the backend technologies provided by profile module 118 and face search module 113 without providing a particular UI directly to user 102. In such an embodiment, requestor 108 may have access to the self-image and may provide that self-image to IDV platform 110 without using IDV platform 110 as an intermediary to provide an interface to receive the self-image.

In 506, IDV platform 110 may employ liveness module 112 to verify the liveness of the self-image of user 102. Liveness module 112 may identify features of the self-image. Liveness module 112 may compare the features to known potential security risks to validate the authenticity of the self-image. Known potential security risks include: a face mask attack, a paper image detection, a deep fake, a static image attack, a virtual camera based-attack using a pre-recorded video, an artificial-intelligence-generated image attack, etc. If the liveness check fails, then method 500 may continue to 528 where a standard KYC process is performed. Additionally, user 102 may be restricted from attempting to use the reusable IDV process for a fixed or random period of time to protect against brute force attacks.

In 508, IDV platform 110 may employ face search module 113 to search previously verified profiles for a matching profile. The matching profile may be a profile having a previously captured image that matches the current self-image. That is, the person in the previously captured self-image has a same face as the person in the current self-image. This ability to match 1-to-N may be completed with reliability and efficiency using recent developments in AI and machine learning.

In 510, if no reusable profile is found matching the self-image, then method 500 may continue to 528 where a standard KYC process or other alternative verification method may be performed. If a matching profile is found, then method 500 may continue to 512.

In 512, IDV platform 110 may select a single matching profile from the subset of matching profiles. In one embodiment, IDV platform 110 may select the most recent matching profile from the subset of matching profiles. However, IDV platform 110 may also consider various parameters passed by requestor 108 and/or user 102 that specify the information required by that particular requestor in determining the matching profile. For example, a particular merchant may mandate and require the capture and verification of a document having an address, the capture of the back side of an ID, a particular document type, etc. Based on such parameters, a particular profile may be selected from the multiple matching profiles that satisfies the requirements of a particular merchant, with the most recent profile again being used to select a single profile if there are multiple matches that satisfy the requirements of the parameters.

In 514, IDV platform 110 may employ fake data generator 117 to create a number of fake profiles populated with randomized data. The randomized data does not correspond to an actual live user but resembles actual data. For example, fake data generator 117 may create four random profiles or other suitable number of random profiles to provide for a statistically significant knowledge-based authentication methodology.

In 516, IDV platform 110 may mask the data retrieved from the matching profile and the fake profiles using a masking algorithm. The masking algorithm may obscure a subset of characters in the information in the profiles. For example, if displaying a name, a document number, and a date of birth, the name and the document number may be obfuscated by replacing sets of characters in the name and document number with asterisks or another suitable character.

In 518, IDV platform 110 may employ UI generator 114 to display the matching profile and the fake profiles. UI generator 114 may also simultaneously display a consent agreement to the user that informs the user that selecting the matching profile grants permission to use personal data in the matching profile to verify the identity of the user. By simultaneously displaying the consent agreement, it obviates the need for user 102 to perform an additional step. An exemplary screen display displaying such an interface is discussed above with reference to FIG. 2E.

In 520, IDV platform 110 may receive a selection from user 102 from among the displayed profiles. The user interface may indicate the user selection of a particular record using highlighting, placing a box around the record, or using another suitable visual cue. Here, user 102 identifies the profile that includes their personally identifying information.

In 522, if the user-selected profile does not match the matching profile (the user selected the incorrect profile), then method 500 may continue to 528 where a standard KYC process or other suitable verification process is performed. If the user-selected profile matches the matching profile (the user selected the correct profile), then method 500 may continue to 524. In some embodiments, IDV platform 110 may employ randomness to secure the process further, e.g., asking the user to provide an ID again at random intervals or providing additional personally identifying information.

In 524, IDV platform 110 may retrieve a previously validated document from the matching profile. The document may be a national ID card, passport, birth certificate, social security card, driver's license, utility bill, telephone bill, mortgage, rental agreement, insurance policy, loan statement, credit card, and any other suitable document suitable for verifying a user's identity.

In 526, IDV platform 110 may extract a photograph from the previously validated document and employ face recognition module 115 to perform a face-to-ID match between the self-image and the extracted photograph. If the faces do not match, then method 500 may continue to 528 where a standard KYC process or other suitable alternative verification process is performed. If the faces do match, then method 500 may continue to 530. In an embodiment, steps 524 and 526 may be performed in parallel with steps 514 through 522. Because the comparison in 526 may take multiple seconds to complete, by running these steps in parallel, the IDV process may be further optimized and avoid causing user 102 to have to wait for the step to complete.

In 528, IDV platform 110 may perform a standard KYC process or alternative process for verifying their identity. As part of a KYC process, the user may be asked to: (1) capture and transmit an image or images of one or more documents; (2) capture and transmit a self-image and (3) confirm identifying information. Such a process is described in further detail below with reference to FIG. 6 and discussed above with reference to FIGS. 3A-3G.

In 530, when user 102 selects the proper profile, the liveness check is successful, and the face-to-ID match is successful, IDV platform 110 may return a response to user 102 and/or the requestor indicating a successful verification of the user's identity. In an embodiment, user 102 may be routed back to requestor 108 without requiring further input.

Figure 6:
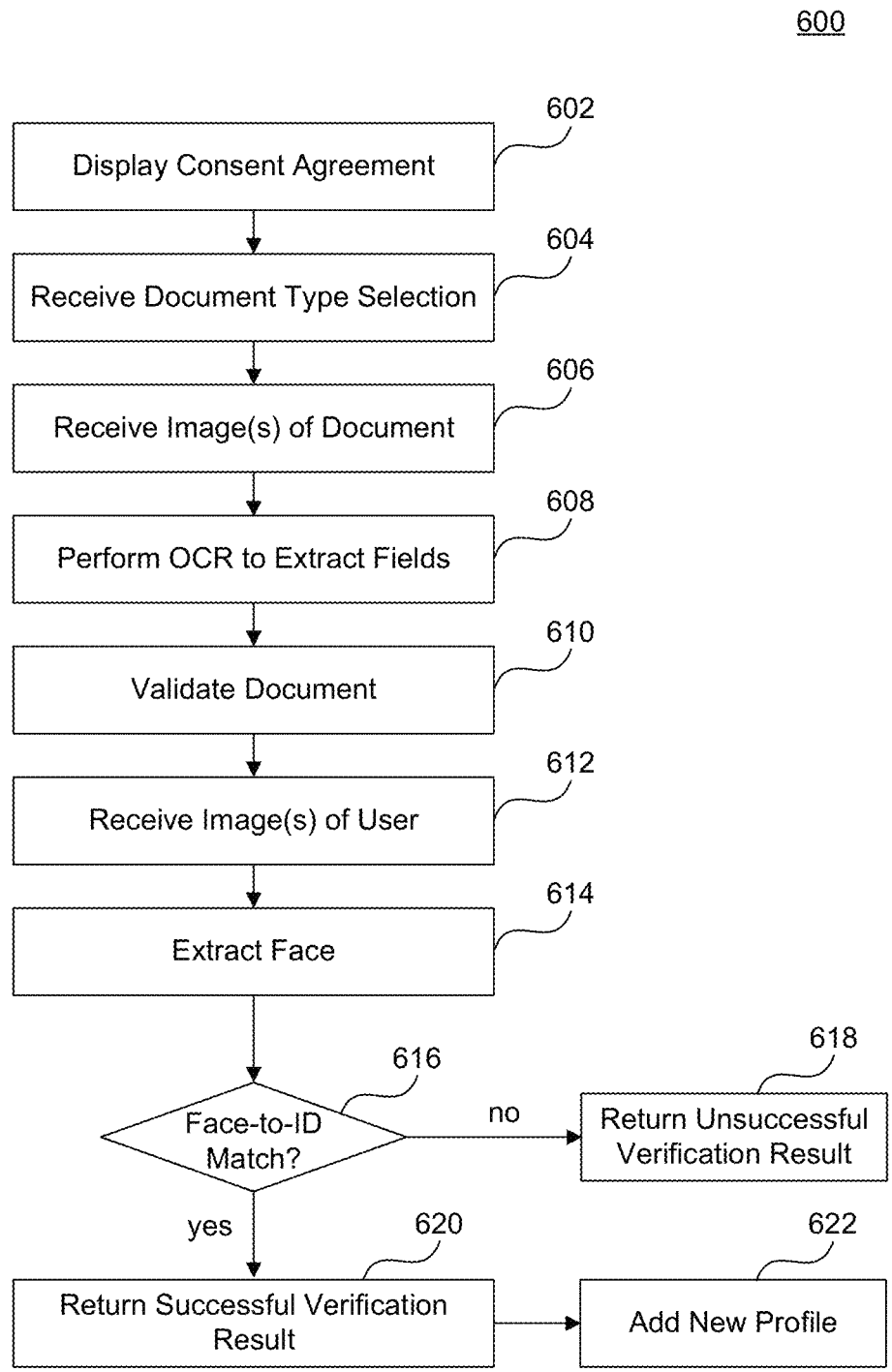
FIG. 6 illustrates a method for verifying an identity using an ID or other document captured and uploaded by a user, according to some embodiments.

FIG. 6 illustrates a method 600 for verifying an identity using an ID or other document captured and uploaded by user 102, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, IDV platform 110 may display a consent agreement to inform user 102 about the purposes for which their data will be used. The displayed information may allow user 102 to knowingly and willingly consent to the use of their data for the purposes of identity verification. User 102 may provide an affirmative assent to the agreement by checking a box or otherwise indicating assent. An example consent agreement is discussed above with reference to FIG. 2A.

In 604, IDV platform 110 may receive from user 102 a selection of a document type to use when verifying identity. Document type may be selected from an ID, passport, driver's license, credit/debit card, utility bill, telephone bill, mortgage, rental agreement, insurance policy, loan statement, credit card, etc. or a subset thereof that may differ based on a selected country. Such a selection of a document type is discussed in detail above with reference to FIG. 3A.

In 606, IDV platform 110 may receive an image or images of one or more documents captured and transmitted by user 102. The types of documents uploaded by user 102 may vary based on the selection in 604 and parameters received from a requestor. Exemplary interface for providing such an image of a document are discussed above with reference to FIGS. 3B-3C.

In 608, IDV platform 110 may perform OCR to extract one or more fields—e.g., date of birth, full name, ID number, from the received document. IDV platform 110 may verify that particular required fields were successfully extracted—e.g., a document name, an expiry date, a document age, a document country, a date of birth, a document number, an issue date, a gender, etc.

In 610, IDV platform 110 may validate the received document. For example, IDV platform 110 may check the authenticity of the document and verify the integrity of the image. The authenticity check may examine the physical characteristics of the ID (e.g., data format, security features, checksums, watermarks, etc.). IDV platform 110 may verify the authenticity by detecting e-documents, black-and-white documents, scanned documents, cropped documents, etc. IDV platform 110 may check the visibility of the document and verify an originality of the document. IDV platform 110 may verify that the front and back of the document belong to a same document. IDV platform 110 may check an expiration date of the document and an originally of the. IDV platform 110 may also compare the ID to lists of documents known to be compromised and perform other suitable processing and security checks to validate the ID. IDV platform 110 may also compare the fields extracted in 608 to user-provided or stored information to ensure that the fields match. If a mismatch is detected, IDV platform 110 may request clarification from user 102, receive another upload of the document, or return an unsuccessful verification result.

In 612, IDV platform 110 may receive a self-image of the user. This self-image will be referred to below as the "current self-image." An interface for receiving such a self-image of a user is discussed above with reference to FIGS. 2B-2C. In an embodiment, the current self-image may also be a series of images or a video.

In 614, IDV platform 110 may extract a face of the user from the received document as validated in 610. For example, IDV platform 110 may employ OCR module 116 to identity the photograph on the document and convert the photograph to an image format or other computer-readable format for use by face recognition module 115.

In 616, IDV platform may employ face recognition module 115 to compare the face in the current self-image with the face extracted from the document. If the face on the document does not match the face in the self-image, then method 600 may continue to 618. If the face on the document matches the face in the self-image, then method 600 may continue to 618.

In 618, an unsuccessful verification result may be returned to user 102 and/or the requestor. That is, if the validation of documents or verification process raises red flags or otherwise fails, an appropriate error message may be returned to the user and/or the requestor indicating a failed verification.

In 620, IDV platform 110 may determine that the ID is valid and that the human in the current self-image has the same face as the human on the ID. If this is true and additional security checks are satisfied, then a successful verification result may be returned to the user and/or a requestor.

In 622, IDV platform 110 may employ profile module 118 to create a "verified profile" that includes the user-provided self-image, an image of the ID, a request status, a timestamp, a referrer, browser information, a list of the checks run and services provided, the fields extracted from the uploaded document using OCR, and other suitable information. IDV platform 110 may add the new verified profile to a repository of all previously verified profiles that includes verified profiles representing every successful identity verification regardless of the merchant. This list of verified profiles may then be referenced for an IDV process using reusable profiles as discussed above with reference to FIG. 5.

Figure 7:
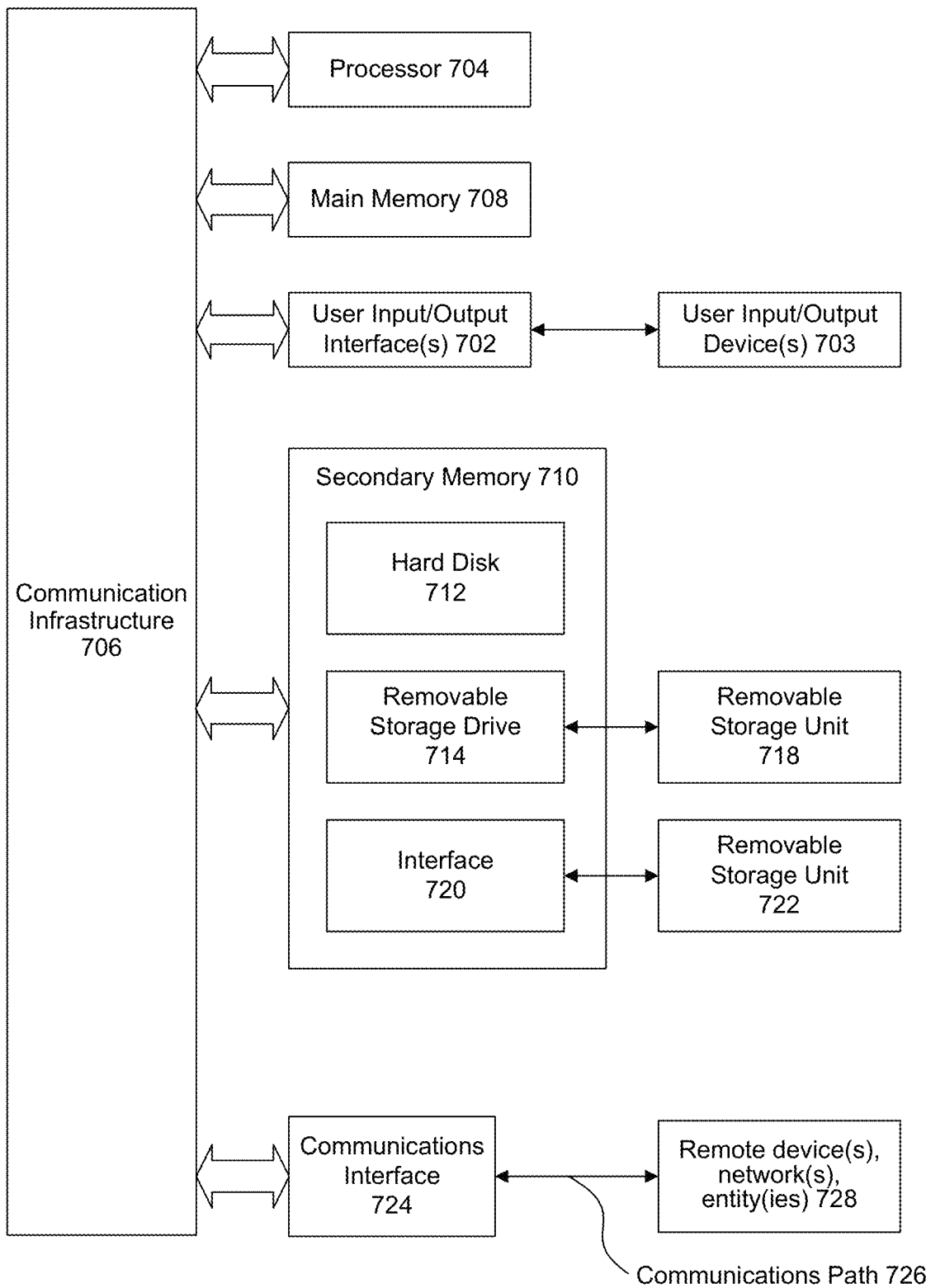
FIG. 7 illustrates a computer system, according to exemplary embodiments of the present disclosure.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for verifying an identity of a user, comprising:
   receiving a request to verify the identity of the user;
   receiving an image of the user;
   determining two or more matching profiles from a plurality of verified profiles comprising validated documents and previously captured images of validated users, the two or more matching profiles associated with two or more previously captured images that match the user in the image of the user;
   selecting a matching profile from the two or more matching profiles, the matching profile being a most recent matching profile;
   displaying information from the matching profile to the user among one or more fake profiles; and
   in response to a correct selection by the user of the matching profile, returning a response verifying the identity of the user.

2. The method of claim 1, further comprising:
   extracting a facial image of a validated user from a validated document associated with the matching profile; and
   confirming that the user is the validated user by comparing the facial image with the image of the user to determine a match.

3. The method of claim 2, the confirming further comprising:
   calculating a match tolerance used by a face recognition module, wherein the match tolerance specifies a degree of similarity required for a first face and a second face to match.

4. The method of claim 3, further comprising:
   adjusting the match tolerance based on a behavioral biometric.

5. The method of claim 4, wherein the behavioral biometric considers two or more factors of an angle of a head in the image, a user manner of presenting their face in an oval presented on a screen, a manner of typing, a browser footprint, a camera resolution, and a cognitive assessment.

6. The method of claim 2, wherein the extracting runs in parallel with the displaying.

7. The method of claim 1, further comprising:
   receiving a second request to verify a second identity of a second user, the second request comprising a second image of the second user;
   determining that no validated user in the previously captured images of validated users matches the second user in the second image of the second user; and
   in response to the determining, verifying the second identity using an alternative verification method.

8. The method of claim 7, wherein the alternative verification method comprises:
   receiving an image of an identification document from the second user;
   validating the identification document;
   extracting one or more fields from the identification document using optical character recognition; and
   adding a new profile to the plurality of verified profiles, the new profile comprising: the one or more fields, the second image of the second user, the image of the identification document, and a timestamp.

9. The method of claim 8, wherein the one or more fields comprise an expiration date, a name, a date of birth, and a document number.

10. The method of claim 8, the validating the identification document further comprising:
    checking the image of the identification document for integrity;
    identifying whether the identification document is a compromised document by referencing a list of compromised identification documents; and
    detecting a mismatch between the one or more fields and user-provided information.

11. The method of claim 1, further comprising:
performing a liveness check on the image of the user by identifying one or more features in the image of the user; and
comparing the one or more features to one or more known potential security risks to validate an authenticity of the image of the user.

12. The method of claim 11, wherein the one or more known potential security risks comprise: a face mask attack, a paper image detection, a deep fake, a static image attack, and an artificial-intelligence-generated image attack.

13. The method of claim 1, wherein the validated documents are one of: a passport, a governmental identification, a driver's license, a credit card, a debit card, a birth certificate, a social security card, a utility bill, a telephone bill, a mortgage, a rental agreement, an insurance policy, or a loan statement.

14. The method of claim 1, the displaying information from the matching profile further comprising:
displaying a consent agreement to the user that informs the user that selecting the matching profile grants permission to use personal data in the matching profile to verify the identity of the user.

15. The method of claim 1, the displaying the matching profile further comprising:
displaying a displayed name, a displayed document number, and a displayed date of birth, wherein the displayed name and the displayed document number are masked by obscuring a subset of characters in the displayed name and the displayed document number.

16. The method of claim 1, further comprising:
receiving a second request to verify a second identity of a second user, the second request comprising a second image of the second user;
selecting a second matching profile from the plurality of verified profiles, the second matching profile selected by determining that a second validated user in a previously captured image associated with the second matching profile matches the second user in the second image of the second user;
determining that an expiration date of a validated document associated with the second matching profile has passed; and
prompting the second user to capture an updated image of an updated identification document.

17. A system for verifying an identity of a user, comprising:
a memory; and
at least one processor coupled to the memory and configured to:
receive a request to verify the identity of the user;
receive an image of the user;
determine two or more matching profiles from a plurality of verified profiles comprising validated documents and previously captured images of validated users, the two or more matching profiles associated with two or more previously captured images that match the user in the image of the user;
select a matching profile from the two or more matching profiles, the matching profile being a most recent matching profile;
display information from the matching profile to the user among one or more fake profiles; and
in response to a correct selection by the user of the matching profile, return a response verifying the identity of the user.

18. A non-transitory computer-readable device having instructions stored thereon that, when executed by at least one computing device, cause the at least one computing device to perform operations for verifying an identity of a user comprising:
receiving a request to verify the identity of the user;
receiving an image of the user;
determining two or more matching profiles from a plurality of verified profiles comprising validated documents and previously captured images of validated users, the two or more matching profiles associated with two or more previously captured images that match the user in the image of the user;
selecting a matching profile from the two or more matching profiles, the matching profile being a most recent matching profile;
displaying information from the matching profile to the user among one or more fake profiles; and
in response to a correct selection by the user of the matching profile, returning a response verifying the identity of the user.

19. The system of claim 17, the at least one processor further configured to:
extract a facial image of a validated user from a validated document associated with the matching profile; and
confirm that the user is the validated user by comparing the facial image with the image of the user to determine a match.

20. The system of claim 19, wherein to confirm, the at least one processor is further configured to:
calculate a match tolerance used by a face recognition module, wherein the match tolerance specifies a degree of similarity required for a first face and a second face to match.

21. The system of claim 20, the at least one processor further configured to:
adjust the match tolerance based on a behavioral biometric.

22. The system of claim 17, the at least one processor further configured to:
perform a liveness check on the image of the user by identifying one or more features in the image of the user; and
compare the one or more features to one or more known potential security risks to validate an authenticity of the image of the user.

23. The system of claim 17, wherein to display information from the matching profile, the at least one processor is further configured to:
display a consent agreement to the user that informs the user that selecting the matching profile grants permission to use personal data in the matching profile to verify the identity of the user; and
display a displayed name, a displayed document number, and a displayed date of birth, wherein the displayed name and the displayed document number are masked by obscuring a subset of characters in the displayed name and the displayed document number.

24. The system of claim 17, the at least one processor further configured to:
receive a second request to verify a second identity of a second user, the second request comprising a second image of the second user;
select a second matching profile from the plurality of verified profiles, the second matching profile selected by determining that a second validated user in a previously captured image associated with the second matching profile matches the second user in the second image of the second user;

determine that an expiration date of a validated document associated with the second matching profile has passed; and prompt the second user to capture an updated image of an updated identification document.

25. The non-transitory computer-readable medium of claim 18, the operations further comprising:

extracting a facial image of a validated user from a validated document associated with the matching profile; and confirming that the user is the validated user by comparing the facial image with the image of the user to determine a match.

26. The non-transitory computer-readable medium of claim 25, the operations further comprising:

calculating a match tolerance used by a face recognition module, wherein the match tolerance specifies a degree of similarity required for a first face and a second face to match.

27. The non-transitory computer-readable medium of claim 26, the operations further comprising:

adjusting the match tolerance based on a behavioral biometric.

28. The non-transitory computer-readable medium of claim 18, the operations further comprising:

performing a liveness check on the image of the user by identifying one or more features in the image of the user; and comparing the one or more features to one or more known potential security risks to validate an authenticity of the image of the user.

29. The non-transitory computer-readable medium of claim 18, the displaying information from the matching profile further comprising:

displaying a consent agreement to the user that informs the user that selecting the matching profile grants permission to use personal data in the matching profile to verify the identity of the user; and displaying a displayed name, a displayed document number, and a displayed date of birth, wherein the displayed name and the displayed document number are masked by obscuring a subset of characters in the displayed name and the displayed document number.

30. The non-transitory computer-readable medium of claim 18, the operations further comprising:

receiving a second request to verify a second identity of a second user, the second request comprising a second image of the second user;

selecting a second matching profile from the plurality of verified profiles, the second matching profile selected by determining that a second validated user in a previously captured image associated with the second matching profile matches the second user in the second image of the second user;

determining that an expiration date of a validated document associated with the second matching profile has passed; and prompting the second user to capture an updated image of an updated identification document.

31. A computer-implemented method for verifying an identity of a user, comprising:

receiving a request to verify the identity of the user, the request comprising one or more parameters;

receiving an image of the user;

determining two or more matching profiles from a plurality of verified profiles comprising validated documents and previously captured images of validated users, the two or more matching profiles associated with two or more previously captured images that match the user in the image of the user;

selecting a matching profile from the two or more matching profiles based on the one or more parameters;

displaying information from the matching profile to the user among one or more fake profiles; and in response to a correct selection by the user of the matching profile, returning a response verifying the identity of the user.

32. The method of claim 31, further comprising:

extracting a facial image of a validated user from a validated document associated with the matching profile; and confirming that the user is the validated user by comparing the facial image with the image of the user to determine a match.

33. The method of claim 32, the confirming further comprising:

calculating a match tolerance used by a face recognition module, wherein the match tolerance specifies a degree of similarity required for a first face and a second face to match.

34. The method of claim 33, further comprising:

adjusting the match tolerance based on a behavioral biometric.

35. The method of claim 31, further comprising:

performing a liveness check on the image of the user by identifying one or more features in the image of the user; and comparing the one or more features to one or more known potential security risks to validate an authenticity of the image of the user.

36. The method of claim 31, the displaying information from the matching profile further comprising:

displaying a consent agreement to the user that informs the user that selecting the matching profile grants permission to use personal data in the matching profile to verify the identity of the user; and displaying a displayed name, a displayed document number, and a displayed date of birth, wherein the displayed name and the displayed document number are masked by obscuring a subset of characters in the displayed name and the displayed document number.

37. The method of claim 31, further comprising:

receiving a second request to verify a second identity of a second user, the second request comprising a second image of the second user;

selecting a second matching profile from the plurality of verified profiles, the second matching profile selected by determining that a second validated user in a previously captured image associated with the second matching profile matches the second user in the second image of the second user;

determining that an expiration date of a validated document associated with the second matching profile has passed; and prompting the second user to capture an updated image of an updated identification document.

38. A system for verifying an identity of a user, comprising:

a memory; and at least one processor coupled to the memory and configured to:

receive a request to verify the identity of the user, the request comprising one or more parameters;
receive an image of the user;
determine two or more matching profiles from a plurality of verified profiles comprising validated documents and previously captured images of validated users, the two or more matching profiles associated with two or more previously captured images that match the user in the image of the user;
select a matching profile from the two or more matching profiles based on the one or more parameters;
display information from the matching profile to the user among one or more fake profiles; and
in response to a correct selection by the user of the matching profile, return a response verifying the identity of the user.

39. The system of claim 38, the at least one processor further configured to:
extract a facial image of a validated user from a validated document associated with the matching profile; and
confirm that the user is the validated user by comparing the facial image with the image of the user to determine a match.

40. The system of claim 39, the at least one processor further configured to:
calculate a match tolerance used by a face recognition module, wherein the match tolerance specifies a degree of similarity required for a first face and a second face to match.

41. The system of claim 40, the at least one processor further configured to:
adjust the match tolerance based on a behavioral biometric.

42. The system of claim 38, the at least one processor further configured to:
perform a liveness check on the image of the user by identifying one or more features in the image of the user; and
compare the one or more features to one or more known potential security risks to validate an authenticity of the image of the user.

43. The system of claim 38, wherein to display information from the matching profile the at least one processor is further configured to:
display a consent agreement to the user that informs the user that selecting the matching profile grants permission to use personal data in the matching profile to verify the identity of the user; and
display a displayed name, a displayed document number, and a displayed date of birth, wherein the displayed name and the displayed document number are masked by obscuring a subset of characters in the displayed name and the displayed document number.

44. The system of claim 38, the at least one processor further configured to:
receive a second request to verify a second identity of a second user, the second request comprising a second image of the second user;
select a second matching profile from the plurality of verified profiles, the second matching profile selected by determining that a second validated user in a previously captured image associated with the second matching profile matches the second user in the second image of the second user;
determine that an expiration date of a validated document associated with the second matching profile has passed; and
prompt the second user to capture an updated image of an updated identification document.

45. A non-transitory computer-readable device having instructions stored thereon that, when executed by at least one computing device, cause the at least one computing device to perform operations for verifying an identity of a user comprising:
receiving a request to verify the identity of the user, the request comprising one or more parameters;
receiving an image of the user;
determining two or more matching profiles from a plurality of verified profiles comprising validated documents and previously captured images of validated users, the two or more matching profiles associated with two or more previously captured images that match the user in the image of the user;
selecting a matching profile from the two or more matching profiles based on the one or more parameters;
displaying information from the matching profile to the user among one or more fake profiles; and
in response to a correct selection by the user of the matching profile, returning a response verifying the identity of the user.

46. The non-transitory computer-readable medium of claim 45, the operations further comprising:
extracting a facial image of a validated user from a validated document associated with the matching profile; and
confirming that the user is the validated user by comparing the facial image with the image of the user to determine a match.

47. The non-transitory computer-readable medium of claim 46, the operations further comprising:
calculating a match tolerance used by a face recognition module, wherein the match tolerance specifies a degree of similarity required for a first face and a second face to match.

48. The non-transitory computer-readable medium of claim 47, the operations further comprising:
adjusting the match tolerance based on a behavioral biometric.

49. The non-transitory computer-readable medium of claim 45, the operations further comprising:
performing a liveness check on the image of the user by identifying one or more features in the image of the user; and
comparing the one or more features to one or more known potential security risks to validate an authenticity of the image of the user.

50. The non-transitory computer-readable medium of claim 45, the displaying information from the matching profile further comprising:
displaying a consent agreement to the user that informs the user that selecting the matching profile grants permission to use personal data in the matching profile to verify the identity of the user; and
displaying a displayed name, a displayed document number, and a displayed date of birth, wherein the displayed name and the displayed document number are masked by obscuring a subset of characters in the displayed name and the displayed document number.

51. The non-transitory computer-readable medium of claim 45, the operations further comprising:
receiving a second request to verify a second identity of a second user, the second request comprising a second image of the second user;

selecting a second matching profile from the plurality of verified profiles, the second matching profile selected by determining that a second validated user in a previously captured image associated with the second matching profile matches the second user in the second image of the second user;

determining that an expiration date of a validated document associated with the second matching profile has passed; and prompting the second user to capture an updated image of an updated identification document.

\* \* \* \* \*